(12) United States Patent
Qi

(10) Patent No.: US 10,778,388 B2
(45) Date of Patent: Sep. 15, 2020

(54) METHOD AND APPARATUS FOR RESOURCE MANAGEMENT IN WIRELESS COMMUNICATION SYSTEMS

(71) Applicant: Samsung Electronics Co., Ltd., Gyeonggi-do (KR)

(72) Inventor: Yinan Qi, Middlesex (GB)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/936,004

(22) Filed: Mar. 26, 2018

(65) Prior Publication Data

US 2018/0278387 A1 Sep. 27, 2018

(51) Int. Cl.
*H04L 5/00* (2006.01)
*H04W 72/04* (2009.01)
(Continued)

(52) U.S. Cl.
CPC .......... *H04L 5/0035* (2013.01); *H04L 5/0091* (2013.01); *H04W 72/044* (2013.01);
(Continued)

(58) Field of Classification Search
CPC ... H04L 5/0035; H04L 5/0091; H04L 1/0003; H04L 1/0009; H04W 72/082; H04W 88/08
See application file for complete search history.

(56) References Cited

U.S. PATENT DOCUMENTS

2012/0155366 A1* 6/2012 Zirwas .................. H04B 7/024
370/312

2014/0219233 A1* 8/2014 Ahn ...................... H04B 7/024
370/329

(Continued)

FOREIGN PATENT DOCUMENTS

WO  WO 2014/109548  7/2014
WO  WO 2014/185725  11/2014
(Continued)

OTHER PUBLICATIONS

3GPP TSG RAN WG1#88, "Enhancements for non-coherent JT", Athens, Greece, Feb. 13-17, 2017.
(Continued)

*Primary Examiner* — Brian P Cox
(74) *Attorney, Agent, or Firm* — The Farrell Law Firm, P.C.

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). A method is provided for operating a wireless communication system including a user equipment (UE), a first base station, and a second base station. The method includes receiving an indication of resources currently allocated for transmitting data from another base station to the UE; determining, based on the received indication, resource management parameters for transmitting data from the base station to the UE; and transmitting data to the UE based on the determined resource management parameters. The determination of the resource management parameters at the base station is offset in time from a corresponding determination of resource management parameters for transmitting the data from the another base station to the UE.

16 Claims, 17 Drawing Sheets

(51) Int. Cl.
  *H04W 88/08*  (2009.01)
  *H04L 1/00*   (2006.01)
  *H04W 72/08*  (2009.01)

(52) U.S. Cl.
  CPC ... *H04W 72/0406* (2013.01); *H04W 72/0426* (2013.01); *H04L 1/0003* (2013.01); *H04L 1/0009* (2013.01); *H04W 72/082* (2013.01); *H04W 88/08* (2013.01)

(56) References Cited

U.S. PATENT DOCUMENTS

| | | | | |
|---|---|---|---|---|
| 2016/0255622 | A1* | 9/2016 | Xiong | H04B 7/024 370/329 |
| 2017/0264466 | A1* | 9/2017 | Hosseini | H04L 25/021 |
| 2018/0199212 | A1* | 7/2018 | Lin | H04W 16/28 |

FOREIGN PATENT DOCUMENTS

| | | |
|---|---|---|
| WO | WO 2015/063592 | 5/2015 |
| WO | WO 2018/031872 | 2/2018 |

OTHER PUBLICATIONS

3GPP TSG RAN WG1#85, "Discussion on non-coherent joint transmission for FeCoMP", Nanjing, China, May 23-27, 2016.
3GPP TR 36.741, 3rd Generation Partnership Project; Technical Specification Gropu Radio Access Network; Study on Further Enhancements to Coordinated Multi-Point (CoMP). Operation for LTE, 2016, www.3gpp.org.
ZTE Corporation et al., "Potential Enhancements and Specification Impact on Non-Coherent JT", R1-1611436, 3GPP TSG RAN WG1 Meeting #87, Nov. 14-18, 2016, 4 pages.
Great Britain Search Report dated Sep. 3, 2018 issued in counterpart application No. 1704709.3, 2 pages.

* cited by examiner

METHOD AND APPARATUS FOR RESOURCE MANAGEMENT IN WIRELESS COMMUNICATION SYSTEMS

CROSS-REFERENCE TO RELATED APPLICATIONS

This application is based on and claims priority under 35 U.S.C. § 119 to United Kingdom Patent Application No. 1704709.3, filed on Mar. 24, 2017, in the Intellectual Property Office of United Kingdom, the disclosure of which is incorporated by reference herein in its entirety.

BACKGROUND

1. Field

This disclosure relates generally to a wireless communication system, and more specifically, to a method and an apparatus for resource management in a wireless communication system.

2. Description of the Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The concept of coordinated multi-point (CoMP) communications was introduced into 3GPP Rel-11 for inclusion in LTE-A, and further developments of CoMP, such as joint transmission, are being considered for their inclusion in 3GPP Rel-14 and Rel-15. CoMP is also likely to be included in 5G communications systems. CoMP is a communication technique in which multiple data streams are simultaneously transmitted to a mobile terminal from different base stations. However, multiple transmission from different base stations may interfere with one another, and thus, data rates may be reduced and error rates may be increased.

SUMMARY

The disclosure is provided to address at least some of the problems discussed above associated with resource management in non-coherent joint transmission in coordinated multi-point communications systems and to provide at least the advantages described below.

According to an embodiment, a method is provided for operating a base station in a wireless communication system. The method includes receiving an indication of resources currently allocated for transmitting data from another base station to a UE; determining, based on the received indication, resource management parameters for transmitting data from the base station to the UE; and transmitting data to the UE based on the determined resource management parameters. The determination of the resource management parameters at the base station is offset in time from a corresponding determination of resource management parameters for transmitting the data from the another base station to the UE.

According to an embodiment, a base station in a wireless communication system is provided. The base station includes a transceiver configured to receive an indication of resources currently allocated for transmitting data from another base station to a UE; and at least one processor configured to determine, based on the received indication, resource management parameters for transmitting data from the base station to the UE. The transceiver is further configured to transmit data to the UE based on the determined resource management parameters, and the determination of the resource management parameters at the base station is offset in time from a corresponding determination of resource management parameters for transmitting the data from the another base station to the UE.

According to an embodiment, a UE in a wireless communication system is provided. The UE includes at least one processor; and a transceiver configured to receive, from a first base station, an indication of resources currently allocated for transmitting data from the first base station to the UE; transmit, to a second base station, an indication of the resources currently allocated for transmitting the data from the first base station to the UE; receive, from the second base station, an indication of resources currently allocated for transmitting data from the second base station to the UE; and transmit, to the first base station, an indication of the resources currently allocated for transmitting the data from the second base station to the UE.

BRIEF DESCRIPTION OF THE DRAWINGS

The above and other aspects, features, and advantages of certain embodiments of the present disclosure will be more apparent from the following detailed description when taken in conjunction with the accompanying drawings, in which.

DETAILED DESCRIPTION

Figure 1:
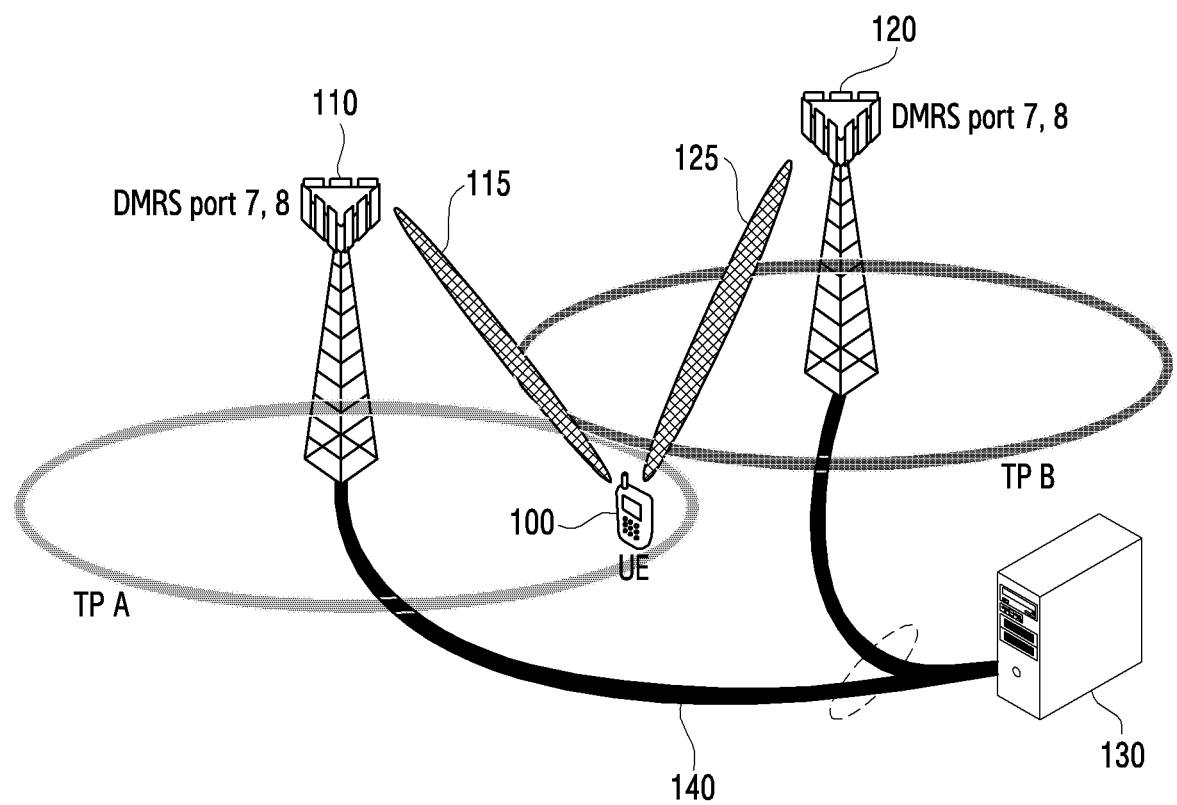
FIG. 1 illustrates coherent joint transmission in a CoMP communication system.

Various embodiments will be described with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

Although embodiments and examples of the disclosure are applicable to Long Term Evolution (LTE) and New Radio (NR), and will be described in the context of a standalone LTE wireless communications network, it will be understood that the disclosure is not limited to any particular radio access technology or mobile communication system generation.

Further, although transmission points are referred to throughout this disclosure, transmission points may also be referred to as base stations, transmission/receptions points (TRPs), enhanced node Bs (eNBs), 5G node Bs (gNBs), wireless access points, or any other equivalent terms. Likewise, although referred to as a user equipment (UE), the terms mobile terminal, portable device, reception devices, or any other equivalent terms may be used. Additionally, although illustrated as a smartphone or similar device, the UE may take the form of any wireless communications device, such as a smart TV, machine communications device, an internet of things (IoT) device, etc.

Wireless or mobile (cellular) communications networks in which a mobile terminal (or user equipment (UE), such as a mobile handset) communicates via a radio link with a network of base stations or other wireless access points connected to a telecommunications network, have undergone rapid developments through a number of generations. Second generation (2G) digital systems such as global system for mobile communications (GSM) have been largely replaced or augmented by third generation (3G) digital systems, such as the universal mobile telecommunications system (UMTS), which uses a universal terrestrial radio access network (UTRAN) radio access technology and a similar core network to GSM. UMTS is specified in standards produced by the 3rd generation partnership project (3GPP). 3GPP has designed, specified and standardized technologies for mobile wireless communications networks.

Fourth generation (4G) systems are now widely deployed to provide greater throughput of data. 3GPP standards for 4G systems include an evolved packet core (EPC) and an enhanced-UTRAN (E-UTRAN) radio access network. The E-UTRAN uses long term evolution (LTE) radio technology, which offers potentially greater capacity and additional features compared with previous standards. More recently, LTE Advanced (LTE-A) has been defined by 3GPP standards releases from 3GPP Release 10 and has been considered to be a 4G mobile communication system by the International Telecommunication Union (ITU).

The trend towards greater data throughput continues with current research to develop fifth generation (5G) network technologies and the new radio (NR) air interface. While the form that 5G networks may take has not yet been fully defined, it is probable that 5G networks will include the capacity to provide extremely high data rates to mobile users in relatively compact geographical areas.

To meet the continually increasing demand for higher data rates and higher volumes of data transmitted through wireless communication systems, one option is to use a wider frequency band, such as may be available in the extremely high frequency (EHF) band (roughly in the 30-300 GHz range). Radio waves in this band range from 10 mm to 1 mm, and the band, therefore, is sometimes referred to as a millimeter band or millimeter wave (mm-wave).

As one example, unlicensed spectrum around 60 GHz may be exploited to provide a high data rate service in a small cell.

Radio waves in the 60 GHz band are subject to high atmospheric attenuation due to absorption by gases in the atmosphere and so are limited in range, though with the benefit of allowing for smaller frequency reuse distances. EHF transmissions are also substantially line of sight and are readily blocked by objects in their paths, or reflected or diffracted by building edges.

These limitations on EHF transmissions may be mitigated through the use of beam-forming, which can increase effective transmission range. Beam-forming may also be exploited at lower frequencies for the purpose of enhanced frequency reuse. Transmission beam-forming concentrates a reach region of a radio wave in a specific direction using a plurality of antennas (e.g., an antenna array). Reception beam-forming concentrates the reception of radio waves from an intended direction using a reception antenna array. One way in which beam-forming can be exploited is through the deployment of small cells, which may be referred to as millimeter wave small cells (mmSCs), utilizing mm-wave frequency. Each mmSC communicates with a UE through the use of a directional beam pair in which respective transmission and reception beams are selected to provide for maximum received signal strengths based on the known or estimated locations of the UE and the mmSC.

The concept of coordinated multi-point (CoMP) communications was introduced into 3GPP Rel-11 for inclusion in LTE-A, and further developments of CoMP, such as joint transmission, are being considered for their inclusion in 3GPP Rel-14 and Rel-15. CoMP is also likely to be included in 5G communications systems. CoMP is a communication technique in which multiple data streams are simultaneously transmitted to a mobile terminal from different base stations, possibly using beamforming techniques, where the resources used by the different base stations may overlap in time and/or frequency. By virtue of CoMP communications, increased data rates, improved coverage and more flexible provision of resources to mobile terminals may be achieved.

CoMP communications may include a joint transmission scheme in which transmissions from different base stations overlap in time and frequency such that the transmissions are received simultaneously at the mobile terminal in overlapping frequency resources. Joint transmission may be implemented in coherent or non-coherent manners using a single user multiple input multiple output (MIMO) scheme, in which, when implemented coherently, multiple transmissions for a single mobile terminal are transmitted from different base stations and precoded together such that the multiple transmissions are effectively received as a single transmission. In non-coherent joint transmission (NCJT), transmissions from different base stations are precoded separately and received as two separate transmissions/data streams.

Consequently, in NCJT, the multiple transmissions may interfere with one another, and thus, data rates may be reduced and error rates increased unless steps to mitigate such interference are taken. Therefore, an approach to resource management for NCJT that includes means to determine and compensate for this interference is required, if the advantages of NCJT in CoMP systems are to be more fully realized.

FIG. 1 illustrates coherent joint transmission in a CoMP communication system.

In coherent joint transmission, the transmission signals from multiple transmission points, are precoded together by an $M \cdot N_T$xRank precoding matrix for reception as a single signal at the UE, where M is the number of transmission points participating in the joint transmission and $N_T$ is the number of transmission antennas per transmission point.

Referring to FIG. 1, UE 100 receives joint transmissions coherently via transmission beams 115 and 125 from transmissions point (TP) A 110 and TP B 120, respectively. The transmissions points may be connected to one another and/or to a higher-level network entity 130 via a backhaul link 140, such as an X2 link in an LTE system, in order to enable coordination between the TPs 110 and 120. The transmissions 115 and 125 from TP A 110 and TP B 120 represent a single data stream transmitted via demodulation reference signal (DMRS) port 7 and 8, where the transmissions 115 and 125 are precoded together to constructively interfere, and thus, effectively be received as a single transmission at the UE 100.

Although shown to be connected via the higher-level network entity 130, in coherent joint transmission, a chosen TP from among the TP A 110 and TP B 120 taking part in the coherent joint transmission may coordinate the transmissions from each of TP A 110 and TP B 120 by performing elements of radio resource management (RRM) centrally, where resource management may include resource allocation and the determination of modulation and coding schemes (MCS). For example, since in coherent joint transmission the transmissions from each base station fully overlap one another in both frequency and time, only a single choice of resources is required to be made for all transmission points. Further, interference characteristics at the UE 100, due to the multiple transmissions, will be known because a single base station has knowledge of all relevant transmissions from the participating transmission points and can determine the appropriate radio resource management parameters.

Figure 2:
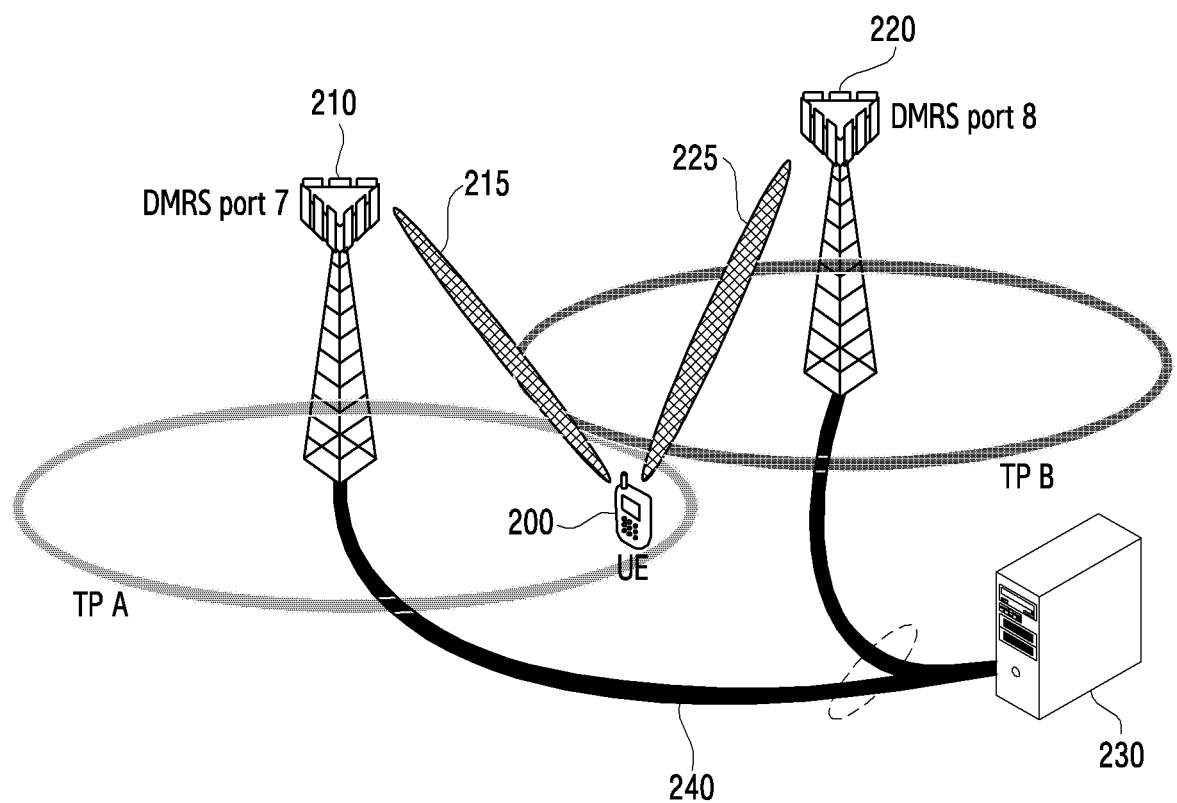
FIG. 2 illustrates NCJT in a CoMP communication system.

FIG. 2 illustrates non-coherent joint transmission (NCJT) in a CoMP communication system.

In contrast to a coherent implementation, in NCJT, precoding is applied individually to the transmissions from each of the M transmission points, such that a UE receives M transmissions, which are each precoded by a separate precoding matrix $N_T$xRank$_i$, where Rank$_i$ is the rank from the $i^{th}$ transmission point participating in the joint transmission. Since each transmission point creates its own spatial layer in NCJT, a UE usually requires multiple reception antennas in order to effectively receive non-coherent joint transmissions.

Referring to FIG. 2, a UE 200 receives joint transmissions non-coherently via beams 215 and 225 from TP A 210 and TP B 220, respectively. As in FIG. 1, TP A 210 and TP B 220 may be connected via a backhaul link 250 to a higher-level network entity 240 in order to enable coordination between TP A 210 and TP B 220. The transmissions 215 and 225 from TP A 210 and TP B 220 represent two separate data streams transmitted via DMRS port 7 and DMRS port 8, respectively, which may overlap in frequency and/or time. The transmissions 215 and 225 are precoded separately, and thus, received as separate transmissions at the UE 200.

Given that the transmissions 215 and 225 from TP A 210 and TP B 220 in FIG. 2 are non-coherent, they may interfere with one another depending on the resources that have been allocated to the transmissions. In particular, the transmissions 215 and 225 from TP A 210 and TP B 220 may be transmitted in resources which overlap in both frequency and time. Consequently, depending on the resources that are allocated to the different transmissions by each transmission point, the interference caused by the reception of the multiple non-coherent transmissions may have to be accounted for.

Figure 3:
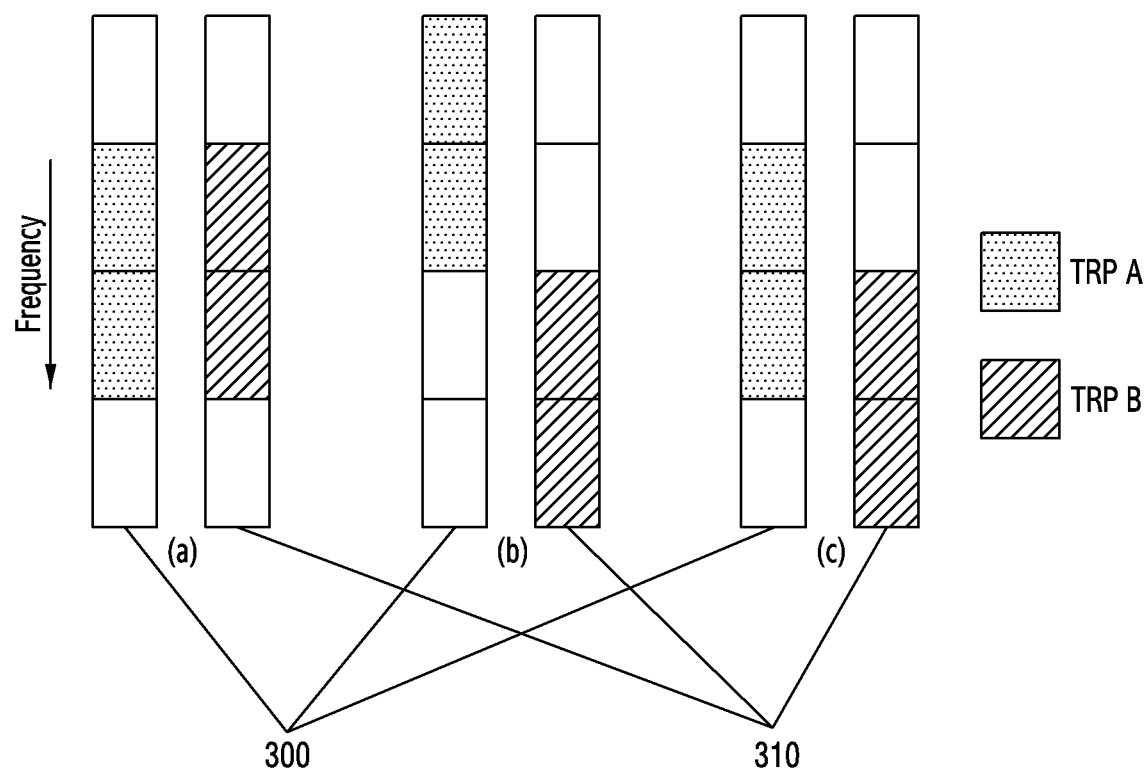
FIG. 3 illustrates interference scenarios that may occur when NCJT is performed in a CoMP communication system.

FIG. 3 illustrates interference scenarios that may occur when NCJT is performed in a CoMP communication system. Specifically, FIG. 3 illustrates in more detail the different resource allocation scenarios that may occur in NCJT, where the resources may be physical resources blocks (PRBs) of a physical downlink shared channel (PDSCH) in an LTE system. The left resources 300 are those under control of TRP A and the right resources 310 are those under control of TRP B, but which overlap at the UE in frequency and time.

In (a) of FIG. 3, the resources utilized for transmissions from TRP A and TRP B to the UE fully overlap in frequency, and thus, resemble the resource allocation in coherent joint transmission. However, the transmissions from TRP A and TRP B are precoded separately in NCJT, and thus, interfere with one another at the UE. Therefore, increased interference is experienced compared to receiving only a single transmission in these PRBs.

In (b) of FIG. 3, the resources utilized for transmissions from TRP A and TRP B to the UE do not overlap in frequency, and thus, the interference experienced is comparable to non-CoMP transmissions.

In (c) of FIG. 3, the resources utilized for transmissions from TRP A and TRP B partially overlap in frequency, such that for some PRBs increased interference is experienced at the UE and for other PRBs reduced interference is experienced at the UE.

In practice, the scenarios of (b) and (c) of FIG. 3 may be more easily accounted for because the nature and extent of the interference from the perspective of either the TRP A transmission or the TRP B transmission at the UE will be approximately constant over frequency. Therefore, an appropriate technique for mitigating the interference caused by NCJT CoMP transmission can be chosen for and maintained for the entire transmissions of codewords from TRP A and TRP B over multiple PRBs. For example, RRM taking into account the higher interference of (a) of FIG. 3 or the lower interference of (b) of FIG. 3 may be performed at each of TRP A and TRP B and kept constant for each codeword transmission.

However, with regards to (c) of FIG. 3, because the resources allocated for the TRP A and TRP B transmissions only partially overlap, the interference experienced by the UE varies with frequency, i.e., it is frequency selective interference. In other words, the scenario of (c) of FIG. 3 is effectively a combination of those illustrated in (a) and (b) of FIG. 3, and thus, the selection of interference mitigation should be varied accordingly during the transmission of a codeword, if optimization of the NCJT is to be achieved. Consequently, different RRM parameters should be selected depending on the nature of the interference at different points in the transmitted codewords in order to increase the optimization of the system.

Figure 4:
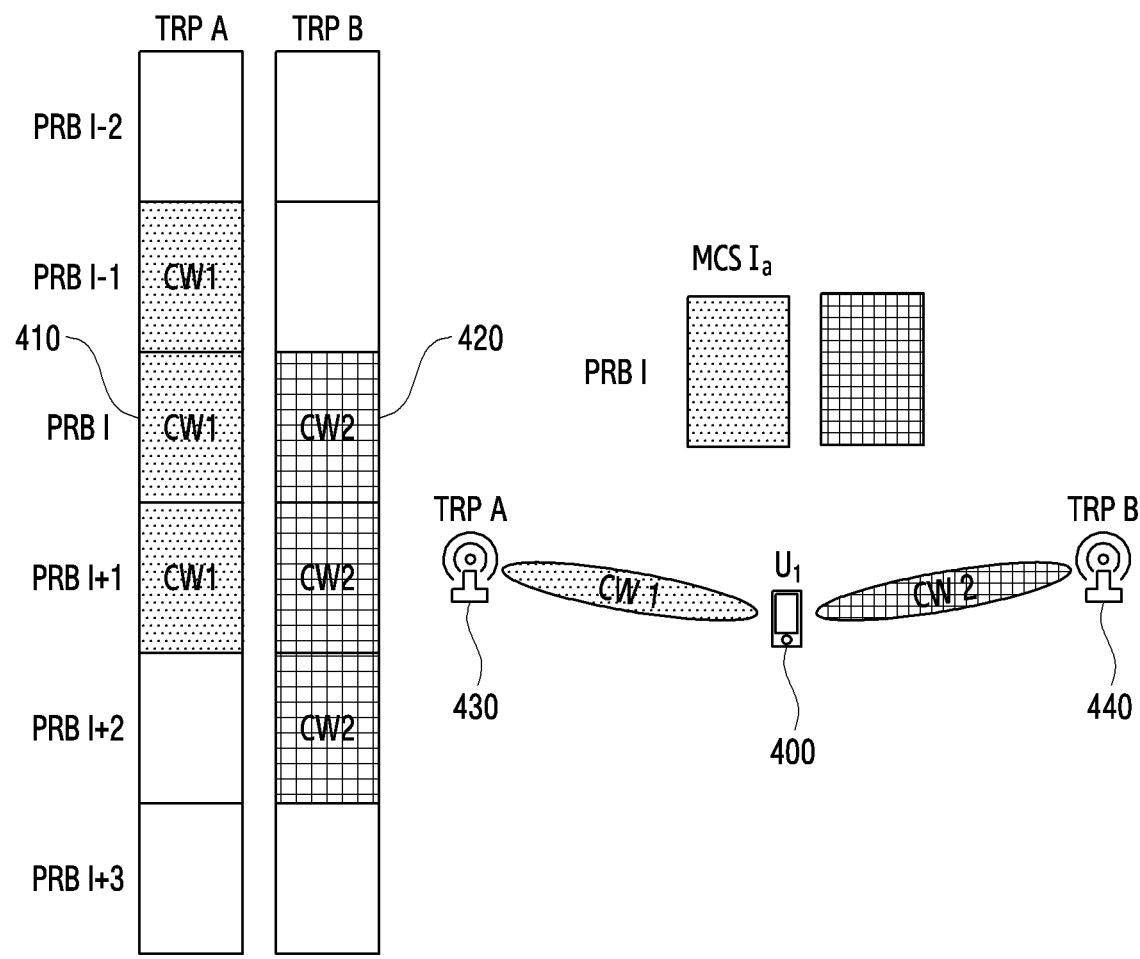
FIG. 4 illustrates an NCJT interference scenario and a corresponding modulation and coding scheme (MCS)
Figure 5:
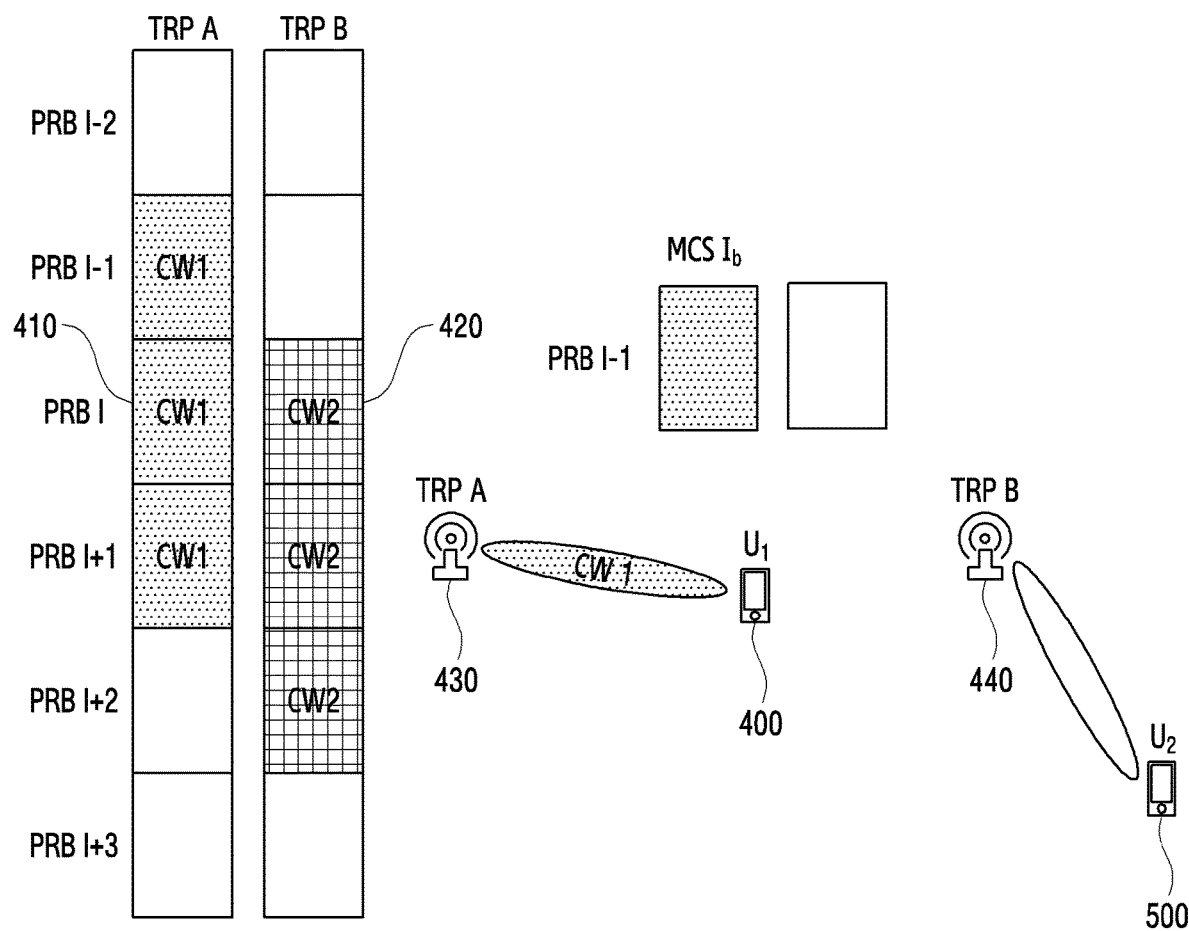
FIG. 5 illustrates an NCJT interference scenario and a corresponding MCS.

FIGS. 4 and 5 illustrate NCJT interference scenarios and corresponding MCSs. Specifically, FIGS. 4 and 5 illustrate a scenario of partially overlapping resource allocations of (c) of FIG. 3 in more detail and also the MCS appropriate for each PRB in a codeword in order to account for the frequency selective interference.

Referring to FIGS. 4 and 5, two codewords, CW1 410 and CW2 420, are transmitted to $UE_1$ 400 by TRP A 430 and TRP B 440 using NCJT, where TRP A transmits its codeword in physical resource blocks PRB 1−1 to 1+1 and TRP B transmits its codeword in physical resource blocks PRB 1 to 1+2. Consequently, the transmissions overlap in PRBs 1 and 1+1, but do not overlap in PRBs 1−1 and 1+2. Consequently, the interference experienced for each codeword varies during the codeword. Accordingly, utilizing a single MCS for each of codewords may not be appropriate with regards to optimizing system performance.

For example, as illustrated in FIG. 4, for TRP A 430, MCS $I_a$ would be appropriate for use in overlapping PRBs 1 and 1+1, and as illustrated in FIG. 5, MCS $I_b$ would be appropriate for resource block 1−1 where TRP B is transmitting to another UE, $UE_2$ 500, in a different beamforming direction using a different precoding matrix, such that its transmission does not substantially interfere with that of TRP A 430 to $UE_1$ 400 in physical resource block I−1. The converse is true for TRP B 440 with respect to physical resource block 1+2. Consequently, MCS $I_a$ may have improved resilience to interference, e.g., may have a lower modulation order and/or stronger error correction/detection coding than MCS $I_b$ but at the cost of a lower data rate.

Consequently, in order to optimize system performance, TRP A 430 and TRP B 440 require improved knowledge of the interference scenario at the UE in the PRBs that they intend to transmit their codewords to the UE in, since, unlike coherent joint transmission, interference characteristics experienced at the UE due to the joint transmission are frequency selective for each codeword and not necessarily known by the transmission points.

Information on the interference scenario in PRBs at the UE, i.e., overlapping or non-overlapping transmission for each PRB, may be provided to the transmission points participating in NCJT using two different mechanisms: 1) UE feedback and/or 2) direct communication between the transmission points via a backhaul link. Within these two mechanisms, the information may be provided in a number of different manners. For example, the UE may feedback current interference measurement results (IMR), the UE may feedback current resource allocation information (RAI) that it has received from the transmission points that it is currently communicating with, the UE may identify overlapping PRBs, or the transmission points may directly communicate their respective resource allocations and received IMRs with each other via a backhaul link. Although the examples herein refer to only a single type of feedback, e.g., RAI, the feedback is not limited thereto and may include any one or more of the aforementioned types.

With respect to the use of feedback provided by the UE, such feedback may be provided using numerous techniques, and the techniques provided by the present disclosure are not limited to particular types of feedback mechanisms. For example, existing reference signals may be used to infer a particular interference scenario and the results reported using existing measurement protocols. Alternatively, new reference signals and associated reporting protocols may be defined, or a UE may feedback information on the resource allocations it has received from other transmission points. Although several possible approaches to providing information on interference scenarios have been given, a detailed consideration of the various approaches for providing feedback or resource allocation information distribution mechanism is beyond the scope of the present disclosure.

When considering how to optimize performance in an NCJT CoMP system, one possible approach is to optimize one or more of the RRM parameters that are that used by the transmissions points. RRM may be performed by a scheduler at a transmission point for each transmission time interval (TTI) and the resulting parameters provided to a UE, e.g., via downlink control information (DCI), where each transmission time interval may be the duration of one or more PRBs. For example, in LTE, a TTI is commonly 1 ms and a PRB block has a duration of 0.5 ms.

With regard to the present disclosure, RRM includes the determination of PRB allocation, when the transmission point allocates PRBs blocks to the UEs it intends to communicate with, and RRM includes the determination of MCS configuration, when the transmission point configures MCS level for the codewords it is to transmit in the next TTI. Nevertheless, RRM may include the determination of various parameters and the RRM parameter determination referred to throughout the remainder of this disclosure is not limited to PRB allocation and MCS configuration parameters.

A potential inference scenario at a UE may be accounted for by selecting PRBs for the transmission, such that transmissions from the transmission points do not overlap where possible, and where overlapping transmissions do occur, selecting MCS appropriate to deal with the increased interference that is likely to occur. For example, when overlapping transmissions are expected to occur, the modulation order may be reduced and/or the coding strength may be increased. However, a detailed discussion beyond a qualitative description of the possible approaches to MCS variation or other interference mitigation techniques once transmissions in overlapping PRB have been identified is beyond the scope of this disclosure.

In the case of NCJT, three different scenarios may commonly arise with regards to optimizing system performance via RRM: 1) no-coordination between transmission points, 2) partial coordination between transmission points, and 3) full coordination between transmission points. These different scenarios may arise depending on the feedback and backhaul characteristics of the communication system. Each of these scenarios is considered in turn below. In all of the scenarios, the communication system is presumed to resemble that of FIG. 2, where two transmission points, possibly connected by an X2 backhaul link, are performing NCJT with respect to a UE using resources that overlap in frequency and time. Although only two transmission points are referenced in the following discussion, the schemes and the underlying concepts described herein are equally applicable to NCJT transmission involving three or more transmission points.

1. No Coordination

In this first scenario, two transmission points, TRP A and TRP B, are presumed to be transmitting codewords CW1 and CW2 to a UE simultaneously, e.g., as illustrated in FIG. 4. Although connected by a backhaul link, this link is presumed to have a large latency and therefore it is not practical to share resource allocation information (RAI) and/or interference measurement reports (IMR) over it since utilizing such information would lead to outdated IMR and RAI being used to perform RRM, thus causing performance degradation.

Alternatively, it may be presumed that no backhaul exist between the transmission points. Consequently, it assumed that TRP A and TRP B perform their RRM separately, i.e., without direct coordination/communication, and rely on feedback information, such as interference measurements and resource allocations, provided by the UE.

However, because the transmission points will be performing RRM independently, when TRP A allocates PRB 1 to CW 1, it does not know if PRB 1 will also be allocated by TRP B to CW 2. Consequently, TRP A does not know whether the MCS should be configured as $I_a$ or $I_b$. Although a worst case scenario may be assumed, i.e., that all PRBs overlap, this may lead to reduced system throughput when overlapping PRBs are not present because the more resilient but less efficient MCS may be chosen, regardless of the actual interference scenario. Consequently, it would be beneficial to know the resource allocations of the other transmission points or the potentially overlapping PRBs, because, without such information, it is likely that an incorrect MCS will be configured and system performance will be degraded and/or optimization not fully achieved.

Although such a problem may be addressed by feeding back resource allocation information from each transmission point to the other transmission point and then iteratively performing RRM in order to converge upon an optimized RRM selection, this would require extremely low latency communications and several rounds of feedback from each transmission point to achieve a single RRM determination and thus introduce unacceptable latency into the RRM procedure.

Consequently, in accordance with an embodiment, in order to address the problem of optimizing RRM when there is no coordination between base stations, the determination of RRM parameters at each participating transmission point for their forthcoming transmissions may be offset in time and the determined RRM parameters may be maintained for at least a minimum predetermined number of TTIs. By virtue of these features, there is sufficient time for information on the resource allocation of each transmission point to be fed back to the other transmission points so they can identify potentially overlapping PRBs before they are required to perform RRM for their forthcoming transmission.

More specifically, without sharing RAI directly between transmission points, only the UE knows the overlapping PRBs, via its received downlink control information (DCI) configuration or interference measurements. Consequently, the UE should feedback the resource allocations it has received from each transmission point, interference measurements, or the identity of overlapping PRBs to the other transmission points involved in the NCJT such that each transmission point can determine which interference scenario may occur, i.e., overlapping or non-overlapping PRBs in the TTIs, and perform RRM accordingly. However, even with UE feedback, each transmission point will only know the overlapping PRBs in the past TTIs and may not have sufficient information to predict overlapping PRBs in the future TTIs. For example, referring to FIG. 4, TRP A 430 will receive the resource allocation of TRP B 440 from the $UE_1$ 400 for TTI n during TTI n, and thus, is not useful for predicting future overlapping PRBs.

In order for transmission points to predict overlapping of PRBs in future TTIs, i.e., to have knowledge of the possible frequency selective interference, the determination of RRM parameters at each transmission point may be offset from one another such that RRM is performed by each transmission point at a different time, and the determined RRM parameters fixed/specified for at least two TTIs, thereby allowing transmission points to have knowledge of future resource allocations.

It is envisaged that RRM parameters will be constant for at least two consecutive TTIs following their determination, but RRM parameters may also be fixed for non-consecutive TTIs and an indication of the TTIs to which the RRM parameters apply provided to the UE and fed back to the transmission points. However, adjustment of the RRM process in this manner would likely require increased signaling and likely reduce the flexibility of RRM. Consequently, throughout this disclosure, it is assumed that RRM is fixed for at least two consecutive TTIs.

Although RRM parameters are described as fixed for a number of consecutive TTIs, this does not limit the transmission points to using the same PRBs and MCS in each TTI, but only that once determined they will not change one or more of the PRB and MCS until the next performance of RRM.

Figure 6:
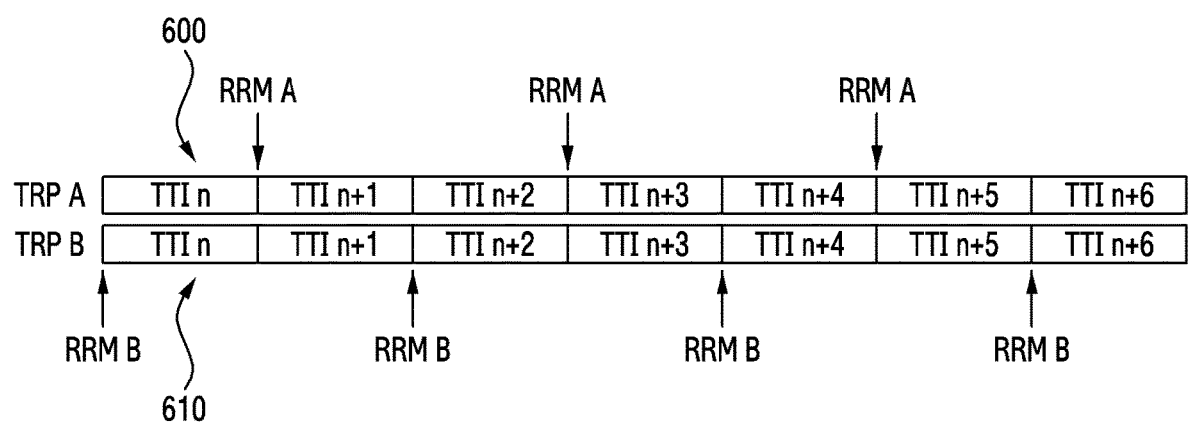
FIG. 6 illustrates a radio resource management (RRM) scheme for NCJT in a CoMP communication system according to an embodiment.

FIG. 6 illustrates an RRM scheme for NOT in a CoMP communication system according to an embodiment.

Referring to FIG. 6, the transmission time intervals 600 and 610 for TRP A and TRP B, respectively, are labelled TTI n, TTI n+1, and so forth.

In FIG. 6, the determination of the RRM parameters, i.e., the performance of RRM, at TRP A and TRP B are offset in time from one another by the duration of one TTI and performed periodically, such that TRP B performs RRM before TTI n, TRP A performs RRM before TTI n+1, TRP B re-performs RRM before TTI n+2, TRP A re-performs RRM before TTI n+3, and so forth. Further, it is assumed that the determined parameters for each RRM instance, such as allocated resources and/or MCS configuration, are valid until a next RRM determination at the respective transmission point, which in the case of FIG. 6, means that the RAI and MCS are known for the next two TTIs for each transmission point.

Also in FIG. 6, it is assumed that the feedback from the UE to each transmission point is periodically provided; includes one or more of overlapping PRBs, RAI, IMR, channel state information (CSI), modulation and coding parameters etc.; and experiences little or negligible latency such that it can be presumed that once the RRM has been performed at a transmission point and DCI information sent to the UE, such that the other transmission point has knowledge of the one or more of the determined RRM parameters or potentially overlapping PRBs for the forthcoming two TTIs. The feedback may be provided as part of existing feedback, such as IMRs, but also it is possible that new feedback routines and information may be defined.

In FIG. 6, TRP A knows the overlapping PRBs during TTI n and then conducts RRM for TTI n+1 and TTI n+2, assuming (or knowing) that the RRM parameters of the transmissions from TRP B to the UE do not change in TTI n+1, which is true since the RRM of TRP B will last for two consecutive TTIs including TTI n+1, thereby allowing it to predict overlapping PRBs.

In the next TTI, e.g., TTI n+1, TRP B knows the overlapping PRBs in TTI n+1 via UE feedback and it conducts RRM for TTI n+2 using the feedback and assuming the RRM parameters of TRP A do not change.

By following this procedure, each transmission point will have knowledge of the PRBs that will be overlapping PRBs, and therefore, will be able to determine RRM parameters suitable for its codeword for both overlapping and non-overlapping PRBs. In one example, the offset should be half the number of TTIs that the current resources allocation is predetermined for, e.g., if resources are predetermined for 4 TTIs, the offset between performances of RRM should be 2 TTIs.

As described above, RRM may include two primary steps, 1) PRB allocation and 2) MCS configuration.

With reference to FIG. 6, when the transmission points perform RRM based on the information fed back from the UE, they may initially select resources based on one or more of overlapping PRBs, CSI, and RAI feedback, in order to reduce interference resulting from channel conditions or overlapping PRB. Subsequently, the transmission points may determine whether each allocated PRB overlaps and then configure MCS appropriately for each PRB within the codeword.

In the implementation illustrated in FIG. 6, the instances of RRM are illustrated as being offset from one another by one TTI and also repeated every two TTIs, such that RRM is performed alternately at TRP A and TRP B. However, the disclosure is not limited thereto. For example, the time between instances of RRM for the NCJT at each transmission point may vary, and thus, the instances of RRM may not alternate between the TRPs, but instead multiple RRMs may be performed at a first TRP for each RRM performed at a second TRP. Although such an approach may reduce the flexibility of RRM at certain transmission points it may also reduce the burden of RRM for NCJT on the transmission points. Such an approach may be of used if the channels between TRP A and TRP B have different fading characteristics or otherwise have different interference characteristics, e.g., if the interference is relatively static, RRM may be required to be performed less often and feedback to the other transmission points reduced.

In some examples, if RRM is not performed alternately between participating transmission points, the performance of RRM may have restrictions on the extent of the change in RRM parameters that may occur, e.g., any changes in RRM parameters may be limited to the MCS, so that the assumption of fixed resource allocation is still valid and potentially overlapping PRBs can be determined.

In some systems, feedback from a UE may experience at least some latency, and thus, it cannot be assumed that RAI received at a UE from a first transmission point or other feedback is instantaneously provided to the other transmission points participating in the NCJT. Consequently, the specific implementation of FIG. 6, in terms of the offset between performances of RRM and the number of TTIs for which RRM parameters are fixed, may not be appropriate for non-deal circumstances.

Figure 7:
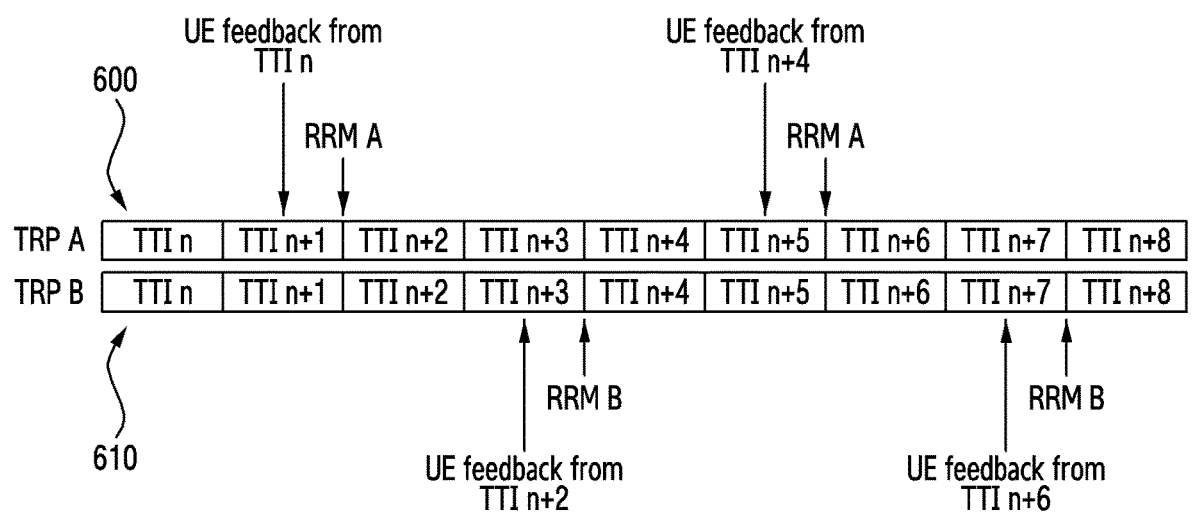
FIG. 7 illustrates an RRM scheme for NCJT in a CoMP communication system according to an embodiment.

FIG. 7 illustrates an RRM scheme for NCJT in a CoMP communication system according to an embodiment. Specifically, FIG. 7 illustrates an RRM scheme in accordance with a more general example, where the feedback from a UE to a transmission point has a latency of m=1, and a latency of m means the overlapping PRBs in TTI n will be known by the other transmission points in TTI n+m.

Referring to FIG. 7, due to the increased latency, RAI for TTI n received at the UE from TRP B (or other feedback) will be received at TRP A from the UE during TTI n+1, which would be too late in the implementation of FIG. 6 for TRP A to identify potentially overlapping PRBs and to perform appropriate RRM for TTI n+1 and TTI n+2.

Consequently, to account for the latency, the period between performances of RRM may be increased, i.e., the offset is increased, which allows time for the RAI or other information to be fed back to the appropriate transmission points before they are to perform RRM. In order to accomplish this, RRM parameters are determined for an increased number of TTIs each time RRM is performed, and the resource allocations resulting from each instance of RRM are unchanged for this increased number of TTIs.

Referring back to FIG. 7, TRP A and TRP B alternately perform RRM every 2 TTIs while assuming the other transmission point will not change RRM parameters in at least the following 2 TTIs and the determined RRM parameters are known for 4 consecutive TTIs. Consequently, each transmission point knows the overlapping and non-overlapping PRBs at the time of performing their respective RRM, and therefore, can perform appropriate resource allocation and MCS configuration.

To ensure that the feedback from the UE is received in time for RRM to be performed based on current resource allocations, the offset between RRM determinations should be greater than the latency in feedback and resource allocations should be determined and kept constant for at least 2(m+1) TTIs. This approach may also reduce the UE feedback from every TTI to every (m+1) TTIs, thereby reducing signaling overhead. In some examples, the number of TTIs for which RRM parameters are determined for and assumed to be constant for may be partially based upon one or more of channel characteristics, the volume of data to be transmitted, processing resources at the UE, network loading, etc. For example, if a large volume of data is to be sent over a slowly varying channel, the period between instances of RRM and the period between feedback instances may be increased compared to transmitting a small volume of data over a fast fading channel.

Although there is no direct communication between the transmission points, an element of coordination may still be performed in order to determine which transmission points first performs RRM and to ensure that the offset between the instances of RRM is correct and sufficiently large enough to account for any latency. For example, the feedback from the UE may trigger performance of RRM, such that the UE is effectively coordinating the operation of the transmission points. Alternatively, given that the feedback from the UE will specify how many TTIs the RRM resource allocation of the other transmission points are fixed for and the feedback will also have knowledge of the latency of the feedback from the UE, the transmission points may calculate the required offset and RRM intervals for correct operation of the offset RRM scheme. In another example, the various parameters of the NCJT may be determined and configured by upper layers, e.g., RRC, when NCJT is initially being set up between the transmissions points using a backhaul link.

2. Partial Coordination

In some circumstances, the backhaul link between transmission points participating in the NCJT introduces only a moderate delay, and therefore, may be used to communicate, in one direction, the IMR and/or RAI between the transmission points. In this case, offset RRM may also be used to mitigate the aforementioned drawbacks of NCJT systems.

Figure 8:
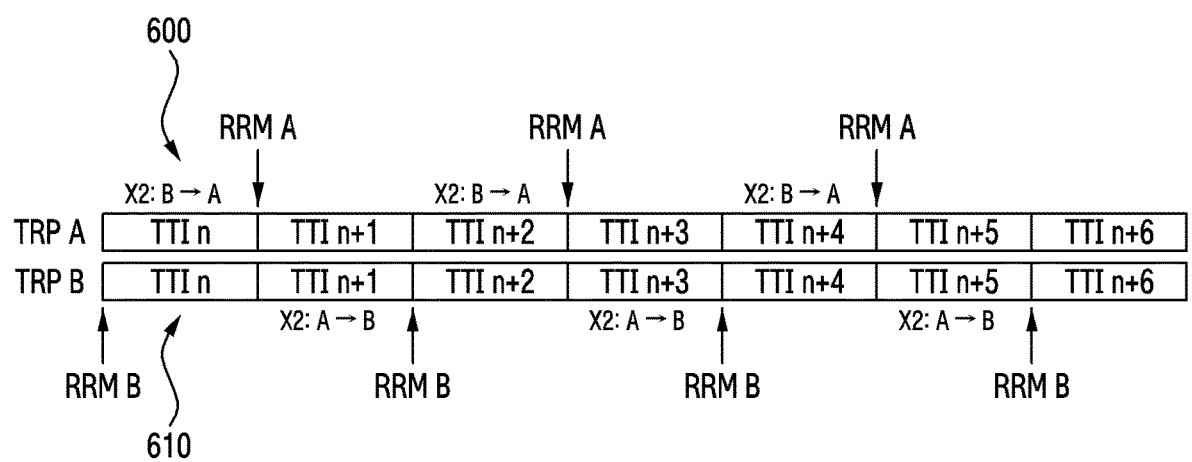
FIG. 8 illustrates an RRM scheme for NCJT in a COMP communication system according to an embodiment.

FIG. 8 illustrates an RRM scheme for NCJT in a CoMP communication system according to an embodiment. Specifically, FIG. 8 illustrates a scheme in accordance with another example of the disclosure, in which RAI and/or IMR are communicated between transmission points and offset RRM is used to account for the latency of such communications.

Referring to FIG. 8, the latency of the communication between the transmission points is assumed to be m=1, such that RAI and/or IMR may be received by other transmission points by one TTI after the associated RRM determination. To account for such latency, the RRM at the participating transmission points are offset by one TTI and RRM parameters are fixed for two TTIs, in a similar manner to that described with reference to FIG. 6. When expressed more generally, each transmission point alternately makes RRM decisions every 2m TTIs and the RRM is kept unchanged for consecutive 2m TTIs.

Although in the example of partial coordination set out above the offset RRM scheme has a similar timing structure to that of FIG. 6, because the transmission points can communicate directly each other, partial coordination provides a more flexible implementation. More specifically, communication between the transmission points via the backhaul link does not utilize wireless resources of the communication system, and therefore, additional information may be communicated, which may in turn improve RRM performance. For example, additional information on a transmission point's MCS may be provided without requiring such information to be fed back from the UE.

Further, in real-world systems, the latency of communications between transmission points via an X2 link is likely to be lower than the latency of feedback between a UE and transmission point, and therefore, the offset associated with the partial coordination scenario is likely to be lower than that for the no coordination approach, thereby allowing more flexible resource allocation because resource allocation is not required to be fixed for as many TTIs after an RRM determination. For example, if the duration for which RRM parameters are fixed is lower, the MCS used by a transmission point may be varied more often, and therefore, variations in channel conditions may be more effectively taken account of.

In the description above, it has been assumed that RRM is fully performed for each set of consecutive TTIs, and thus, the parameters are predetermined for all the TTIs in the set, allowing each transmission point to assume knowledge of resource allocations and MCS for the whole set of TTIs. However, in some examples, while the resource allocation element of RRM may be performed only when specified above and also be fixed for the predetermined number of TTIs, MCS may be varied more regularly in order to account for changing channel conditions, even though resource allocation has not changed.

For example, referring again to the example scheme of FIG. 7, although full RRM, i.e., PRB allocation and MCS configuration, may be performed every 4 TTIs, the MCS configuration may be changed every 2 or 1 TTIs, as in conventional RRM, in order to account for varying channel conditions. However, if RRM at TRP A is based upon the MCS chosen by TRP B as well as the resources allocated by TRP B (i.e., overlapping PRBs), variation of the MCS mid-offset cycle/TTI set may lead to performance degradation because TRP A will not be aware of such a change in MCS at TRP B. Also, even if RRM parameters for NCJT do not change between TTIs, DCI control information may still be received by the UE in the physical downlink control channel (PDCCH) at the beginning of a subframe in LTE, where the DCI may include conventional resource allocation information (i.e., non NCJT resources) so that the UE may also receive conventional transmissions from one or more of the transmissions points. In some examples, the DCI information communication at the beginning of each TTI/subframe may repeat the previously fixed RRM parameters for the NCJT transmission such that the DCI for each subframe specifies all resources in the next subframe allocated to the UE from the transmission point regardless of the transmission technique used to transmit in each resource.

3. Full Coordination

In some circumstances, it may be presumed that the latency of communications via the X2 link between transmission points is negligible, and therefore, transmission points may freely share their resource allocation information and received IMR, and RRM may be performed jointly between the transmission points, thereby improving optimization of RRM to be achieved since multiple combinations of RRM parameters may be considered and determined, i.e., a global optimum solution to RRM parameters may be achieved.

Joint RRM may be performed by a chosen transmission point among the coordinating TRPs or may be performed by a higher-level network entity.

In terms of the complexity of performing an exhaustive joint RRM scheme, if it is assumed that an entire operating band consists of K PRBs and each transmission point allocates k PRBs to the UE, the total number of candidate allocations to be examined to find the optimal allocation can be expressed as shown in Equation (1) below $$N=(C_K^k)^{N_{TRP}} \qquad (1)$$

In Equation (1), $N_{TRP}$ is total number of coordinating TRPs. Consequently, joint RRM involves high complexity because it grows exponentially with $N_{TRP}$, and thus, the optimization complexity may reach a prohibitive level.

However, if offset RRM is used in combination with full coordination, the complexity of optimizing RRM parameters may be reduced to $N=N_{TRP}C_K^k$, which is significantly smaller as it grows with $N_{TRP}$ linearly. Consequently, although an exhaustive search of possible resource RRM parameters is not performed, performance is still likely to be improved, but with a significantly lower complexity, which may be advantageous in networks where complexity and power consumption are particular areas of concern.

Figure 9:
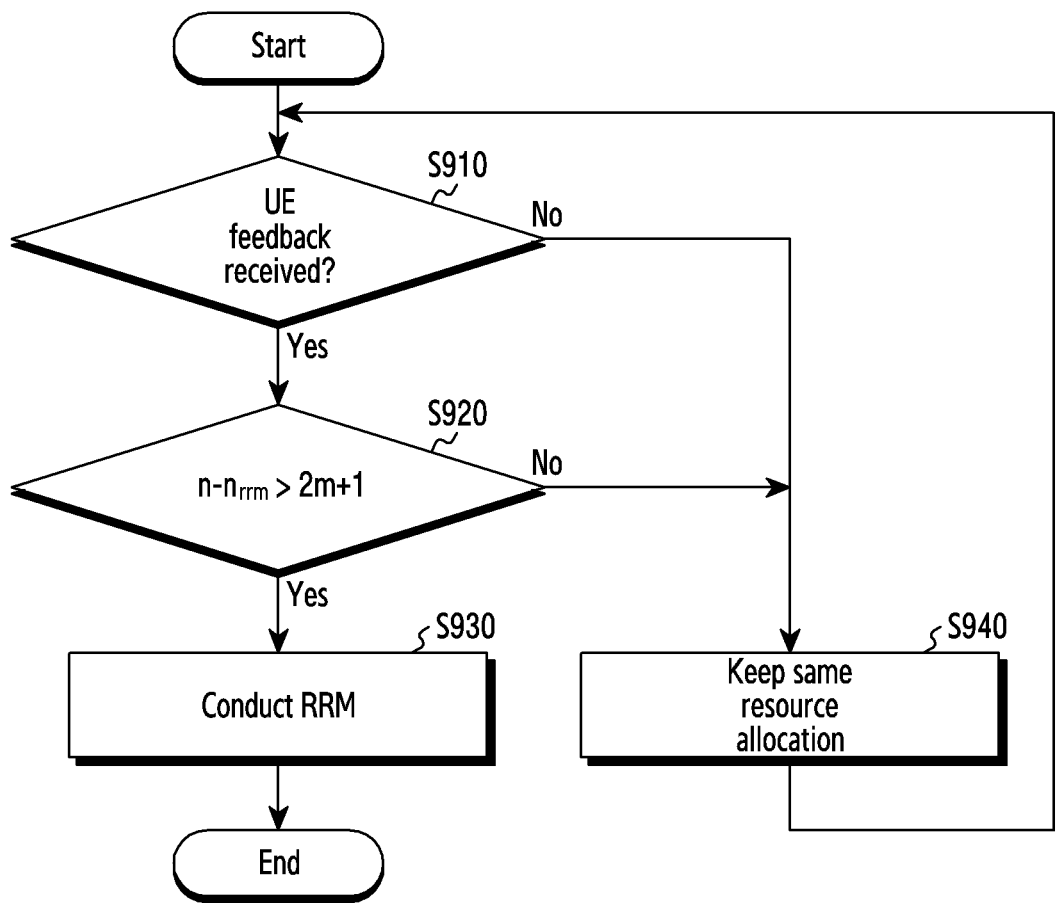
FIG. 9 is a flow diagram illustrating a method for determining whether to perform RRM for NCJT in a CoMP communication system according to an embodiment.

FIG. 9 is a flow diagram illustrating a method for determining whether to perform RRM for NCJT in a CoMP communication system according to an embodiment. Specifically, FIG. 9 illustrates the process of performing RRM in accordance with the example scheme illustrated in FIG. 7.

Referring to FIG. 9, two conditions are required to be satisfied before RRM is performed: 1) feedback from the UE is required, and 2) performance of RRM must also be due, i.e., the required offset has elapsed between the previous instance of RRM performed for the NCJT. If either of the conditions are not satisfied, the resource allocation is maintained.

More specifically, at step S910, it is determined whether UE feedback has been received. If UE feedback has been received, then it is determined whether the condition $n-n_{rrm}>2m+1$ has been satisfied at step S920, where n is the current TTI index, $n_{rrm}$ is the index of the latest TTI with RRM conducted, and m is the UE feedback delay. If the condition $n-n_{rrm}>2m+1$ has been satisfied, then RRM is performed at step S930.

If either of the determination of steps S910 and S920 are negative, then RRM is not performed, and the previously determined RRM parameters (i.e. resource allocations) are maintained at step S940. Thereafter, the method returns to step S910.

Figure 10:
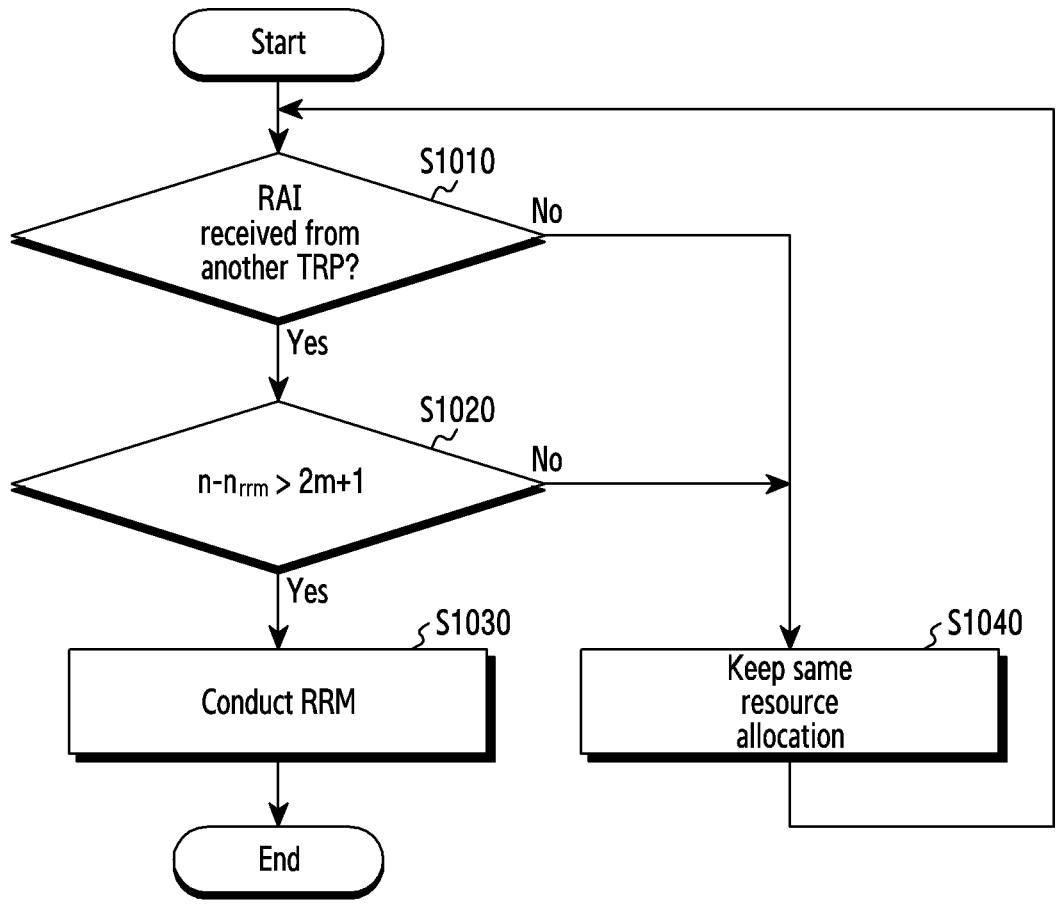
FIG. 10 is a flow diagram illustrating a method for determining whether to perform RRM for NCJT in a CoMP communication system according to an embodiment.

FIG. 10 is a flow diagram illustrating a method for determining whether to perform RRM for NCJT in a CoMP communication system according to an embodiment. Specifically, FIG. 10 illustrates the process of performing RRM in accordance with the example illustrated in FIG. 8.

Referring to FIG. 10, two conditions are required to be satisfied before RRM is performed: 1) RAI is required to be received from another transmission points participating in the NCJT, and 2) performance of RRM must also be due, i.e., the required offset has elapsed between the previous instance of RRM performed for the NCJT. If either of the conditions is not satisfied, the resource allocation is maintained.

More specifically, at step S1010, it is determined whether RAI has been received from another transmission point. If RAI has been received, then it is determined whether the condition $n-n_{rrm}>2m+1$ has been satisfied at step S1020, where n is the current TTI index, $n_{rrm}$ is the index of the latest TTI with RRM conducted, and m is X2 interface delay. If the condition $n-n_{rrm}>2m+1$ has been satisfied, then RRM is performed at step S1030. If either of the determination of steps S1010 and S1020 are negative, then RRM is not performed, and the previous resource allocations are maintained at step S1040. Thereafter, the method returns to S1010.

Figure 11:
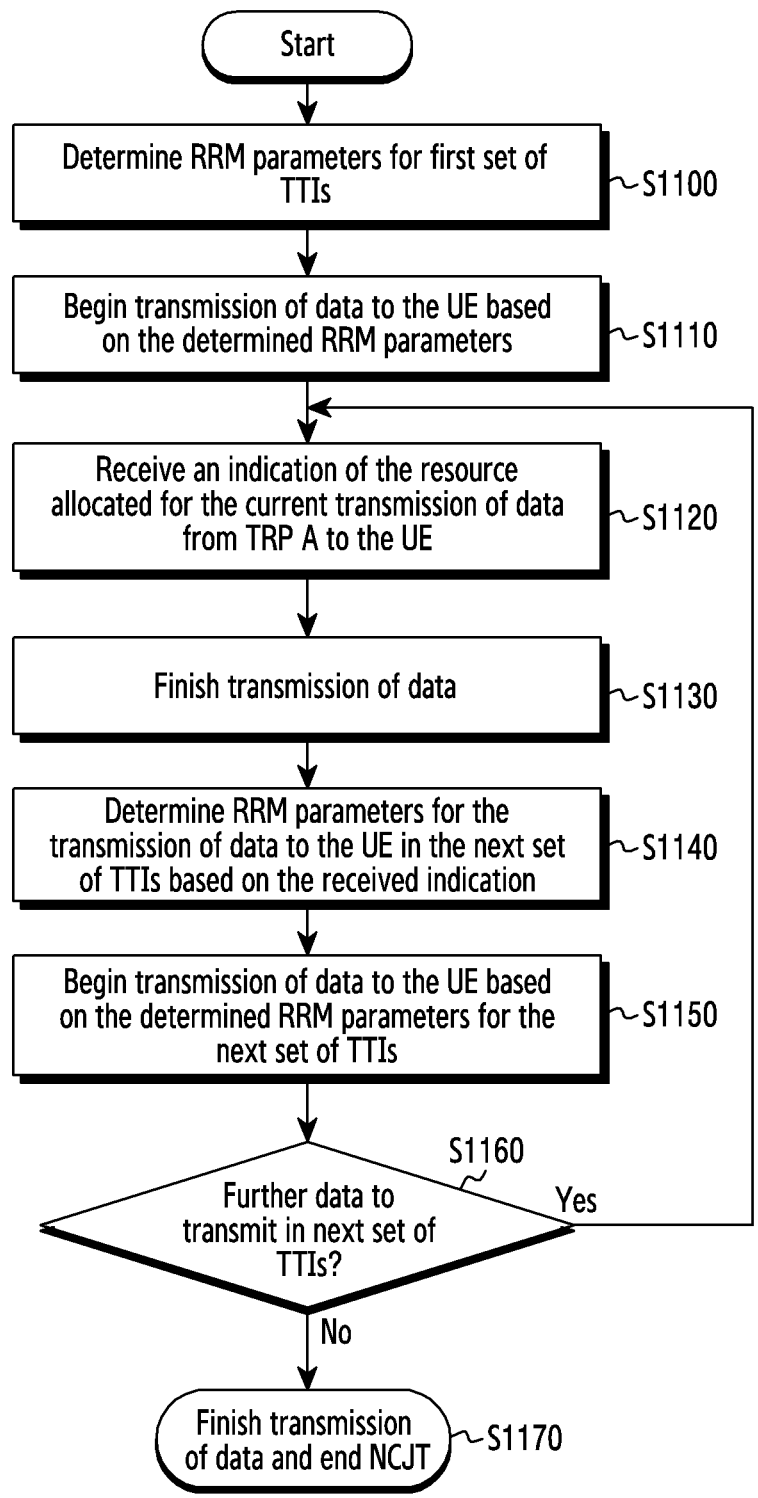
FIG. 11 is a flow diagram illustrating a method performed by a transmission point in an RRM scheme for NCJT in a CoMP communication system according to an embodiment.

FIG. 11 is a flow diagram illustrating a method performed by a transmission point in an RRM scheme for NCJT in a CoMP communication system according to an embodiment. Specifically, FIG. 11 illustrates an example of the operation of transmission point TRP B in the foregoing schemes in which there is either no coordination or partial coordination.

Referring to FIG. 11, in step S1100, RRM parameters for the first set of TTIs are determined, where the set of TTIs refers to the number of consecutive TTIs for which resource allocation is fixed.

At step S1110, transmission of data to the UE commences based on the determined RRM parameters.

At step S1120, during the transmission of the data to the UE, an indication of the resource allocation of TRP A for its current transmission to the UE is received. This indication may be received from the UE or from TRP A via a backhaul link and may indicate RAI, overlapping PRBs, IMR, etc.

At step S1130, the transmission of data to the UE for the current set of TTIs is completed.

At step S1140, based on the indication of resources allocated by TRP A, RRM is performed for the next set of TTIs.

As step S1150, transmission of data to the UE is performed based on the determined RRM parameters.

At step 1160, it is determined whether there is further data to be transmitted to the UE in the next set of TTIs. If there is further data to be transmitted, then the method returns to Step S1120. However, if there is no further data to transmit in the next set of TTIs, the current transmission is completed and TRP A ends its participation in NCJT at step S1170.

Although the steps of FIG. 11 have been illustrated and described in a particular order, this order is not fixed, and certain processes may coincide with one another. For example, the determination of RRM parameters for the next set of TTIs (Step S1140) may occur during the transmission of the data in the current set of TTIs. Further, certain steps may not be required or additional steps may be included in some examples. For example, the operation of the TRP B may include an additional step of sending RAI information determined as part of the RRM to TRP A via a backhaul link and also to the UE in DCI prior to transmission of data using the determined parameters.

Figure 12:
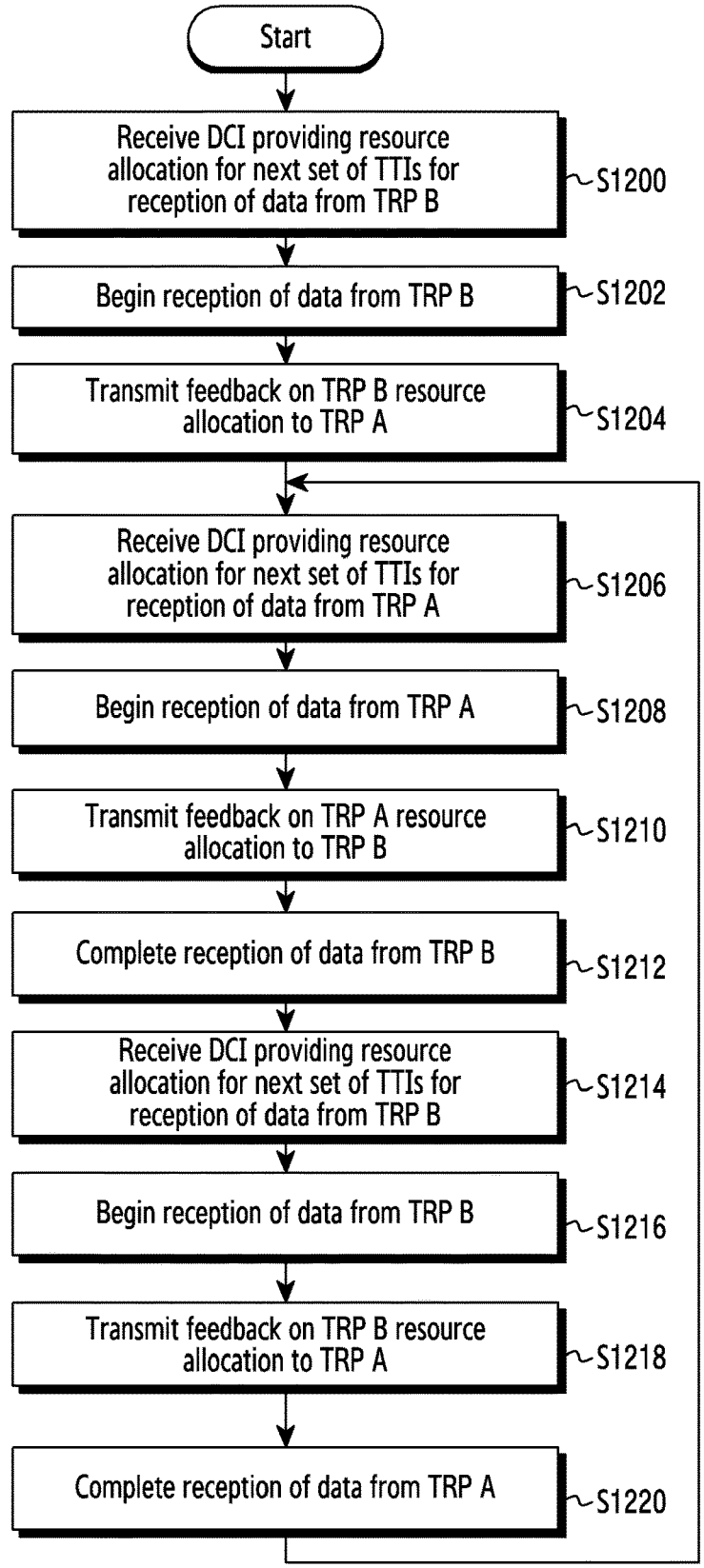
FIG. 12 is a flow diagram illustrating a method performed by a UE in an RRM scheme for NCJT in a CoMP communication system according to an embodiment.

FIG. 12 is a flow diagram illustrating a method performed by a UE in an RRM scheme for NCJT in a CoMP communication system according to an embodiment.

Specifically, FIG. 12 illustrates the operations of a UE when receiving data in an NCJT scheme as described with reference to FIGS. 6 and 7, in which the UE provides feedback to the transmission points on its resource allocations.

Referring to FIG. 12, at step 1200, the UE receives information on an initial resource allocation from TRP B via DCI for the reception of data from TRP B. This resource allocation is valid for the next set of TTIs (e.g., TTI n and TTI n+1 in FIG. 6) and specifies the PRBs in which data (codeword) is to be received and possibly also MCS configurations.

At step 1202, the UE begins reception of the data from TRP B in the allocated resources (e.g., in TTI n and TTI n+1 of FIG. 6).

At step 1204, the UE feeds back an indication of the resource allocation of TRP B to TRP A in order to allow TRP A to perform RRM for its data that it is to transmit in its next set of TTIs (e.g., TTI n+1 and TTI n+2 in FIG. 6) with knowledge of potentially overlapping PRBs and MCS configuration of TRP B.

At step 1206, the UE receives resource allocation information from TRP A via DCI for the reception of data from TRP A. This resource allocation is valid for the next set of TTIs (e.g., TTI n+1 and TTI n+2 in FIG. 6) and specifies the PRBs in which the data is to be received.

At step 1208, the UE begins reception of the data from TRP A in the allocated resources (e.g., in TTI n+1 and TTI n+2 of FIG. 6) while the reception of data from TRP B is still being performed, such that the transmissions from TRP A and TRP B are being received simultaneously.

At step 1210, the UE feeds back an indication of the resource allocation of TRP A to TRP B in order to allow TRP B to perform RRM for the next set of TTIs (e.g., TTI n+2 and TTI n+3) with knowledge of potentially overlapping PRBs and MCS configuration of TRP A.

At step 1212, the UE completes reception of the data from TRP B while the reception of data from TRP A continues.

At step 1214, the UE receives the next resource allocation from TRP B via DCI for the reception of data from TRP B in the next set of TTIs (e.g., TTI n+2 and TTI n+3 in FIG. 6).

At step S1216, the UE begins reception of the next data from TRP B in the allocated resources (e.g., in TTI n+2 and TTI n+3 in FIG. 6) while the reception of data from TRP A is still being performed, such that the transmissions from TRP A and TRP B are being received simultaneously.

At step S1218, the UE feeds back an indication of the resource allocation of TRP B to TRP A in order to allow TRP A to perform RRM for the next set of TTIs (e.g., TTI n+3 and TTI n+4 of FIG. 6) with knowledge of potentially overlapping PRBs.

At step 1220, the reception of data from TRP A is completed while the reception of data from TRP B continues, and if NCJT is to be continued, the method returns to step S1206 and the preparation for the reception of data from TRP A in the next set of TTIs is configured.

Similar to FIG. 11, the steps of the flow diagram of FIG. 12 may be performed in a different order, certain steps may be removed and additional steps may be included. For example, the order in which feedback is transmitted to the transmission points and the beginning of the reception of data in the resources indicated in the feedback may vary, feedback may not be transmitted at all if there is partial coordination between the transmission points, and additional feedback such as interference measurement reports may be transmitted to the transmission points in some scenarios.

Further, in both FIGS. 11 and 12, the initiation and completion of NCJT may be performed in numerous different ways with different levels of coordination between the UE and the participating transmission points. However, the advantages in terms of improved RRM that arise from one or more of the provision of resource allocation information to the transmission points, the offset between performances of RRM at each transmission point, and the fixed resource allocations for at least two TTIs are achieved regardless of the initialization and completion procedures of NCJT.

Figure 13:
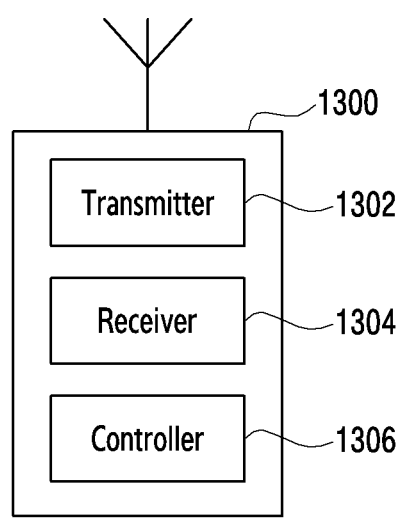
FIG. 13 illustrates a transmission point according to an embodiment.

FIG. 13 illustrates a transmission point according to an embodiment. Specifically, FIG. 13 illustrates a transmission point 1300 that operates in accordance with the embodiments described above.

Referring to FIG. 13, the transmission point 1300 includes a transmitter 1310 that transmit signals to a UE; a receiver 1320 that receives signals from the UE; and a controller 1330 that controls the transmitter and receiver, performs processing, and communicates with other transmission points in accordance with the above described methods of performing offset RRM.

Figure 14:
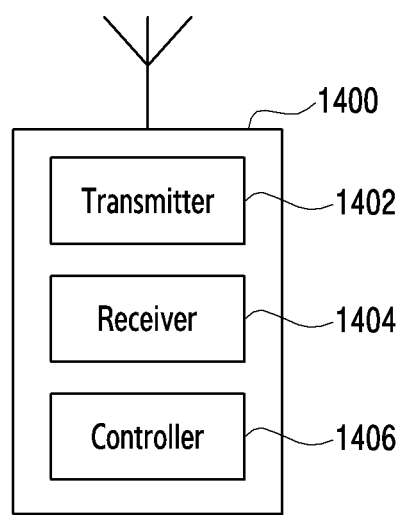
FIG. 14 illustrates a UE according to an embodiment.

FIG. 14 illustrates a UE according to an embodiment. Specifically, FIG. 14 illustrates a UE 1400 that operates in accordance with the embodiments described above.

Referring to FIG. 14, the UE 1400 includes a transmitter 1410 that transmits signals to a transmission point; a receiver 1420 that receives signals from a transmission point; and a controller 1440 that controls the transmitter and receiver and performs processing in accordance with the above described methods of performing offset RRM.

Although in FIGS. 13 and 14 the transmitter, receiver, and controller have been illustrated as separate elements, any single element or plurality of elements which provide equivalent functionality may be used to implement the examples of the disclosure described above.

Figure 15:
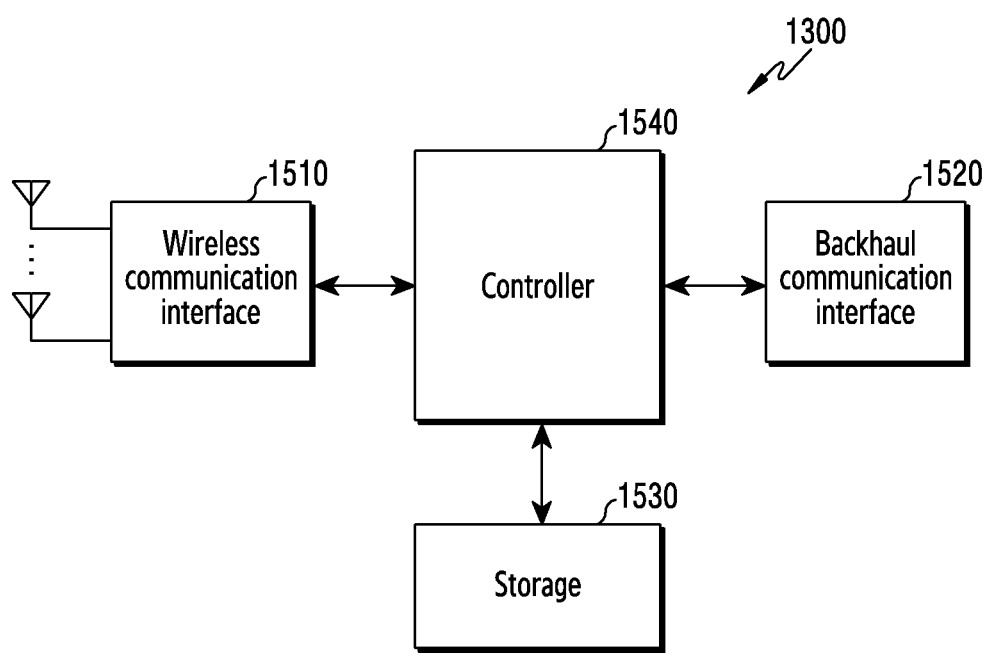
FIG. 15 illustrates a transmission point in a wireless communication system according to an embodiment.

FIG. 15 illustrates a transmission point 1300 in a wireless communication system according to an embodiment.

Referring to FIG. 15, the transmission point 1330 includes a wireless communication interface 1510, a backhaul communication interface 1520, a storage unit 1530, and a controller 1540. The wireless communication interface may include the transmitter 1302 and the receiver 1304, and the controller 1540 may include the controller 1306, as illustrated in FIG. 13.

The wireless communication interface 1510 performs functions for transmitting and receiving signals through a wireless channel. For example, the wireless communication interface 1510 may perform a function of conversion between a baseband signal and bitstreams according to a physical layer standard of the system. In data transmission, the wireless communication interface 1510 may generate complex symbols by encoding and modulating transmission bitstreams. Further, in data reception, the wireless communication interface 1510 may reconstruct reception bitstreams by demodulating and decoding the baseband signal.

In addition, the wireless communication interface 1510 up-converts the baseband signal into a radio frequency (RF) band signal, transmits the converted signal through an antenna, and then down-converts the RF band signal received through the antenna into the baseband signal. To this end, the wireless communication interface 1510 may include a transmission filter, a reception filter, an amplifier, a mixer, an oscillator, a digital-to-analog convertor (DAC), an analog-to-digital convertor (ADC), etc. Further, the wireless communication interface 1510 may include a plurality of transmission/reception paths. In addition, the wireless communication interface 1510 may include at least one antenna array consisting of a plurality of antenna elements.

On the hardware side, the wireless communication interface 1510 may include a digital unit and an analog unit. The analog unit may include a plurality of sub-units according to operation power, operation frequency, etc. The digital unit may be implemented as at least one processor (e.g., a digital signal processor (DSP)).

The wireless communication interface 1510 transmits and receives the signal as described above. Accordingly, the wireless communication interface 1510 may be referred to as a "transmitter" a "receiver," or a "transceiver." Further, transmission and reception performed through the wireless channel may have a meaning including the processing performed by the wireless communication interface 1510 as described above.

The backhaul communication interface 1520 provides an interface for performing communication with other nodes within the network. That is, the backhaul communication interface 1520 converts bitstreams transmitted to another node, e.g., another access node, another BS, a higher node, or a core network, from the transmission point 1300 into a physical signal, and converts the physical signal received from the other node into the bitstreams.

The storage unit 1530 stores a basic program, an application, and data such as setting information for the operation of the transmission point 1300. The storage unit 1530 may include a volatile memory, a non-volatile memory, or a combination of volatile memory and non-volatile memory. Further, the storage unit 1530 provides stored data in response to a request from the controller 1540.

The controller 1540 controls the general operation of the transmission point 1300. For example, the controller 1540 transmits and receives a signal through the wireless communication interface 1510 or the backhaul communication interface 1520. Further, the controller 1540 records data in the storage unit 1530 and reads the recorded data. The controller 1540 may performs functions of a protocol stack that is required from a communication standard.

Alternatively, the protocol stack may be included in the wireless communication interface 1510. To this end, the controller 1540 may include at least one processor.

According to an embodiment, the controller 1540 may control to receive an indication of resources currently allocated for transmission of data from another base station to a UE, determine, based on the received indication, resource management parameters for a transmission of data from the base station to the UE, and transmit data to the UE based on the determined resource management parameters. The determination of the resource management parameters at the base station is offset in time from a corresponding determination of resource management parameters for a transmission of data from the other base stations to the UE. For example, the controller 1540 may control the transmission point 1300 to perform operations according to an embodiment.

Figure 16:
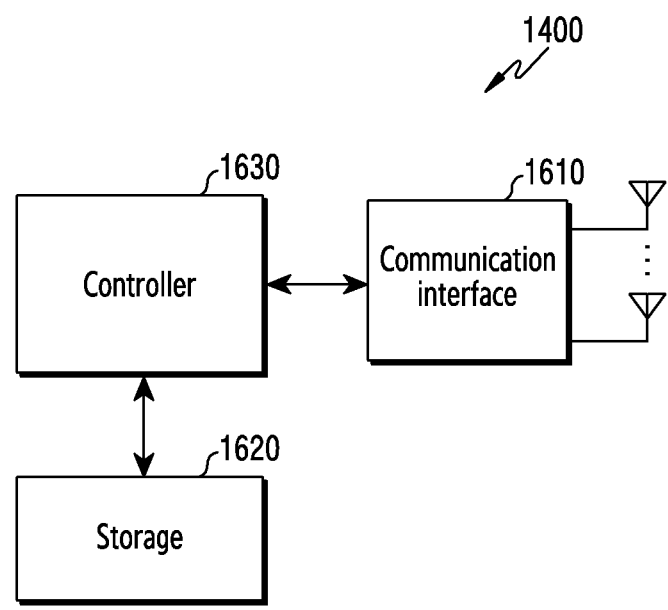
FIG. 16 illustrates a UE in a wireless communication system according to an embodiment.

FIG. 16 illustrates a UE 1400 in a wireless communication system according to an embodiment.

Referring to FIG. 16, the UE 1400 includes a communication interface 1610, a storage unit 1620, and a controller 1630. The communication interface 1610 may include the transmitter 1402, and the receiver 1404 and the controller 1630 may include the controller 1406, as illustrated in FIG. 14.

The communication interface 1610 performs functions for transmitting/receiving a signal through a wireless channel. For example, the communication interface 1610 performs a function of conversion between a baseband signal and bitstreams according to the physical layer standard of the system. For example, in data transmission, the communication interface 1610 generates complex symbols by encoding and modulating transmission bitstreams. In data reception, the communication interface 1610 reconstructs reception bitstreams by demodulating and decoding the baseband signal. In addition, the communication interface 1610 up-converts the baseband signal into an RF band signal, transmits the converted signal through an antenna, and then down-converts the RF band signal received through the antenna into the baseband signal. For example, the communication interface 1610 may include a transmission filter, a reception filter, an amplifier, a mixer, an oscillator, a DAC, and an ADC.

The communication interface 1610 may include a plurality of transmission/reception paths. In addition, the communication interface 1610 may include at least one antenna array consisting of a plurality of antenna elements.

In the hardware side, the communication interface 1610 may include a digital circuit and an analog circuit (e.g., a radio frequency integrated circuit (RFIC)). The digital circuit and the analog circuit may be implemented as one package. The digital circuit may be implemented as at least one processor (e.g., a DSP). The communication interface 1610 may include a plurality of RF chains. The communication interface 1610 may perform beamforming.

The communication interface 1610 transmits and receives the signal as described above. Accordingly, the communication interface 1610 may be referred to as a "transmitter," a "receiver," or a "transceiver." Further, transmission and reception performed through the wireless channel may have a meaning including the processing performed by the communication interface 1610 as described above.

The storage unit 1620 stores a basic program, an application, and data such as setting information for the operation of the UE 1400. The storage unit 1620 may include a volatile memory, a non-volatile memory, or a combination of volatile memory and non-volatile memory. Further, the storage unit 1620 provides stored data in response to a request from the controller 1630.

The controller 1630 controls the general operation of the UE 1400. For example, the controller 1630 transmits and receives a signal through the communication interface 1610. The controller 1630 records data in the storage unit 1620 and reads the recorded data. The controller 1630 may performs functions of a protocol stack that is required from a communication standard.

Alternatively, the protocol stack may be included in the communication interface 1610. To this end, the controller 1630 may include at least one processor or microprocessor, or may play the part of the processor. Further, the part of the communication interface 1610 or the controller 1630 may be referred to as a communication processor (CP).

According to an embodiment, the controller 1630 may control to receive, from a first base station, an indication of resources currently allocated for transmission of data from the first base station to the UE 1400, transmit, to a second base station, an indication of the resources currently allocated for transmission of data from the first base station to the UE 1400, receive, from the second base station, an indication of resources currently allocated for transmission of data from the second base station to the UE 1400, and transmit, to the first base station, an indication of the resources currently allocated for transmission of data from the second base station to the UE. For example, the controller 1630 may control the UE 1400 to perform operations according to an embodiment.

Figure 17:
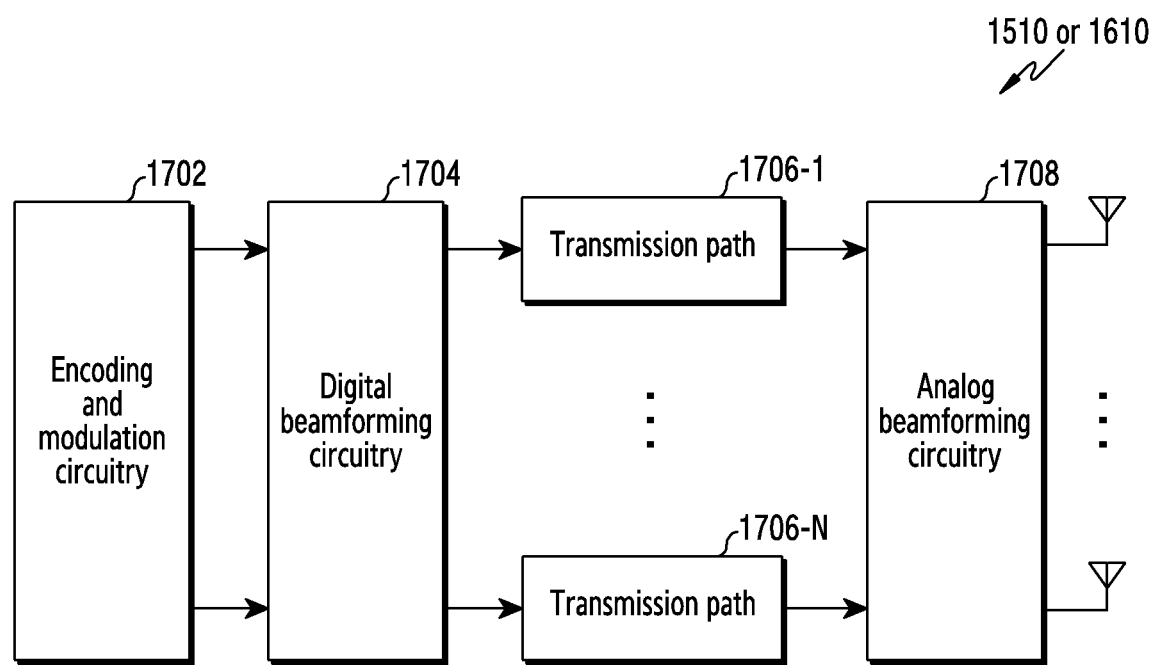
FIG. 17 illustrates a communication interface in a wireless communication system according to an embodiment.

FIG. 17 illustrates a communication interface in a wireless communication system according to an embodiment. Specifically, FIG. 17 illustrates an example of the communication interface 1510 of FIG. 15 or the communication interface 1610 of FIG. 16. More specifically, FIG. 17 illustrates elements for performing beamforming as part of the communication interface 1510 of FIG. 15 or the communication interface 1610 of FIG. 16.

Referring to FIG. 17, the communication interface 1510 or 1610 includes encoding and modulation circuitry 1702, digital beamforming circuitry 1704, a plurality of transmission paths 1706-1 to 1706-N, and analog beamforming circuitry 1708.

The encoding and modulation circuitry 1702 performs channel encoding. For the channel encoding, at least one of a low-density parity check (LDPC) code, a convolution code, and a polar code may be used. The encoding and modulation circuitry 1702 may generate modulation symbols by performing constellation mapping.

The digital beamforming circuitry 1704 performs beamforming for a digital signal (e.g., modulation symbols). To this end, the digital beamforming circuitry 1704 multiples the modulation symbols by beamforming weighted values. The beamforming weighted values may be used for changing the size and phrase of the signal, and may be referred to as a "precoding matrix" or a "precoder." The digital beamforming circuitry 1704 outputs the digitally beamformed modulation symbols to the plurality of transmission paths 1706-1 to 1706-N. According to a MIMO transmission scheme, the modulation symbols may be multiplexed, or the same modulation symbols may be provided to the plurality of transmission paths 1706-1 to 1706-N.

The plurality, of transmission paths 1706-1 to 1706-N convert the digitally beamformed digital signals into analog signals. To this end, each of the plurality of transmission paths 1706-1 to 1706-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (e.g., a filter bank multi-carrier (FBMC)) is applied. That is, the plurality of transmission paths 1706-1 to 1706-N provide independent signal processing processes for a plurality of streams generated through the digital beamforming. However, depending on the implementation, some of the elements of the plurality of transmission paths 1706-1 to 1706-N may be used in common.

The analog beamforming circuitry 1708 performs beamforming for analog signals. To this end, the digital beamforming circuitry 1704 multiples the analog signals by beamforming weighted values. The beamformed weighted values are used for changing the size and phrase of the signal.

More specifically, according to a connection structure between the plurality of transmission paths 1706-1 to 1706-N and antennas, the analog beamforming circuitry 1708 may be configured in various ways. For example, each of the plurality of transmission paths 1706-1 to 1706-N may be connected to one antenna array. As another example, the plurality of transmission paths 1706-1 to 1706-N may be connected to one antenna array. As yet another example, the plurality of transmission paths 1706-1 to 1706-N may be adaptively connected to one antenna array, or may be connected to two or more antenna arrays.

In the above described devices, the term "-module", "-unit" or "-er" used may refer to a unit for processing at least one function or operation and may be implemented in hardware, software, or a combination of hardware and software.

In accordance with the above-described embodiments, by providing an indication of resource allocations and also offsetting the determination of resource management parameters, base stations in cooperative multi-point networks performing non-coherent joint transmissions may take into account expected interference characteristics at the UE caused by non-coherent transmission when determining resource management parameters, thus providing improved system performance.

According to one example, each of the currently allocated resources span a plurality of predetermined transmission time intervals, and the determination of the resource management parameters at the first base station and the determination of the resource management parameters at the second base station are offset by at least one transmission time interval.

According to another example, the resources are divided in frequency and time into a plurality of resource blocks, and determining the resource management parameters includes one or more of: determining one or more resource blocks to allocate for the transmission of data to the UE, determining a coding scheme for the transmission of data to the UE, and determining a modulation scheme for the transmission of data to the UE. According to another example, the data transmissions from the first base station and the second base station to the UE are based on the respective determined resource management parameters for at least two consecutive transmission time intervals.

According to another example, the currently allocated resources each span a different set of consecutive transmission time intervals, and the sets overlap by at least one transmission time interval.

According to another example, the data transmissions from the first base station and the second base station to the UE based on the determined respective resource management parameters partially overlap in frequency and in time.

According to another example, receiving the indication of the resources currently allocated for the transmission of data from the first base station to the UE includes one or more of: receiving, from the UE, an indication of the resources allocated to the UE by the first base station for receiving data from the first base station; and receiving, from the first base station, an indication of the resources allocated for transmission of data from the first base station to the UE.

According to another example, the indication of the resources allocated for the transmission of data from the first base station to the UE is based on resource allocation information received at the UE from the first base station, and the indication of the resources allocated for the transmission of data from second base station to the UE is based on resource allocation information received at the UE from the second base station.

According to another example, the indication of the resources allocated for the transmission of data from the first base station to the UE includes one or more of: resource allocation information received from the first base station; information identifying one or more overlapping resources between the resources allocated for transmission of data from the second base station to the UE and the resources allocated for transmission of data from the first base station to the UE; modulation and coding parameters of data to be transmitted in the resources allocated for the transmission of data from the first base station to the UE; channel measurements of the UE; and interference measurements of the UE.

According to another example, the offset is greater than a time between the beginning of the resources allocated for transmission of data from the second base station to the UE and the reception of the indication of resources currently allocated for transmission of data from the second base station to the UE at the first base station, and the time between the beginning of the resources allocated for transmission of data from the first base station to the UE and the reception of the indication of resources currently allocated for transmission of data from the first base station to the UE at the second base station.

According to another example, the reception of the indication of resources currently allocated for the transmission of data from the second base station to the UE and the reception of the indication of resources currently allocated for transmission of data from the first base station to the UE are offset in time.

According to another example, the transmissions from the first base station and the second base station are received at the UE as independent transmissions.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, or characteristics described in conjunction with a particular aspect, embodiment, or example of the disclosure are to be understood to be applicable to any other aspect, embodiment or example described herein unless incompatible therewith.

All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed.

The various embodiments and examples described herein may also be implemented via computer executable instructions stored on a computer readable storage medium, such that when executed cause a computer to operate in accordance with any other the aforementioned embodiments.

The above embodiments and examples are to be understood as illustrative examples of the disclosure. Further embodiments of the disclosure are envisaged. It is to be understood that any feature described in relation to any one embodiment may be used alone, or in combination with other features described, and may also be used in combination with one or more features of any other of the embodiments, or any combination of any other of the embodiments. Further, equivalents and modifications not described above may also be used without departing from the scope of the disclosure, which is defined in the accompanying claims.

What is claimed is:

1. A method performed by a first base station in a wireless communication system, the method comprising:

receiving, from a user equipment (UE), an indication of resources allocated for transmission of data from a second base station to the UE;

determining, based on the indication received from the UE, first resource management parameters for a transmission of data from the first base station to the UE; and transmitting data to the UE based on the first determined resource management parameters, wherein the first resource management parameters at the first base station are determined based on a time offset corresponding to second resource management parameters for a transmission of data from the second base station to the UE.

2. The method of claim 1, wherein each of the allocated resources span a plurality of predetermined transmission time intervals, and wherein the first resource management parameters at the first base station and the second resource management parameters at the second base station are determined based on the time offset by at least one transmission time interval.

3. The method of claim 1, wherein the resources are divided by frequency and time into a plurality of resource blocks, and wherein determining the first resource management parameters comprises:

determining one or more resource blocks to allocate for the transmission of data from the first base station to the UE, determining a coding scheme for the transmission of data from the first base station to the UE, and determining a modulation scheme for the transmission of data from the first base station to the UE.

4. The method of claim 3, wherein the data transmissions from the first base station to the UE are based on the first determined resource management parameters for at least two consecutive transmission time intervals.

5. The method of claim 4, wherein the allocated resources each span a different set of consecutive transmission time intervals, and wherein the different sets overlap by at least one transmission time interval.

6. The method of claim 1, wherein the data transmissions from the first base station and the second base station to the UE based on the determined respective resource management parameters partially overlap in frequency and in time.

7. The method of claim 1, wherein the indication of the resources allocated for the transmission of data from the second base station to the UE is based on resource allocation information received at the UE from the second base station.

8. The method of claim 1, wherein the time offset is greater than a time between a beginning of the resources allocated for transmission of data from the second base station to the UE and the reception of the indication of the resources allocated for transmission of data from the second base station to the UE at the first base station, and a time between a beginning of the resources allocated for transmission of data from the first base station to the UE and the reception of the indication of the resources allocated for transmission of data from the first base station to the UE at the second base station.

9. A first base station in a wireless communication system, the first base station comprising:

a transceiver configured to receive, from a user equipment (UE), an indication of resources allocated for transmission of data from a second base station to the UE; and at least one processor configured to determine, based on the received indication, first resource management parameters for a transmission of data from the first base station to the UE, wherein the transceiver is further configured to transmit data to the UE based on the first determined resource management parameters, wherein the first resource management parameters at the first base station are determined based on a time offset corresponding to second resource management parameters for a transmission of data from the second base station to the UE.

10. The first base station of claim 9, wherein each of the allocated resources span a plurality of predetermined transmission time intervals, and wherein the first resource management parameters at the first base station and the second resource management parameters at the second base station are determined based on the time offset by at least one transmission time interval.

11. The first base station of claim 9, wherein the resources are divided in frequency and time into a plurality of resource blocks, and wherein the at least one transceiver is further configured to:

determine one or more resource blocks to allocate for the transmission of data from the first base station to the UE, determine a coding scheme for the transmission of data from the first base station to the UE, and determine a modulation scheme for the transmission of data from the first base station to the UE.

12. The first base station of claim 11, wherein the data transmissions from the first base station to the UE are based on the first determined resource management parameters for at least two consecutive transmission time intervals.

13. The first base station of claim 12, wherein the allocated resources each span a different set of consecutive transmission time intervals, and wherein the different sets overlap by at least one transmission time interval.

14. The first base station of claim 9, wherein the data transmissions from the first base station and the second base station to the UE based on the determined respective resource management parameters partially overlap in frequency and in time.

15. The first base station of claim 9, wherein the indication of the resources allocated for the transmission of data from the second base station to the UE is based on resource allocation information received at the UE from the second base station.

16. The first base station of claim 9, wherein the time offset is greater than a time between a beginning of the resources allocated for transmission of data from the second base station to the UE and the reception of the indication of the resources allocated for transmission of data from the second base station to the UE at the first base station, and a time between a beginning of the resources allocated for transmission of data from the first base station to the UE and the reception of the indication of the resources allocated for transmission of data from the first base station to the UE at the second base station.

\* \* \* \* \*

UNITED STATES PATENT AND TRADEMARK OFFICE
CERTIFICATE OF CORRECTION

PATENT NO. : 10,778,388 B2
APPLICATION NO. : 15/936004
DATED : September 15, 2020
INVENTOR(S) : Yinan Qi Page 1 of 1

It is certified that error appears in the above-identified patent and that said Letters Patent is hereby corrected as shown below:

On the Title Page

Add item (30):
-- (30) Foreign Application Priority Data
Mar. 24, 2017  (GB) ............ 1704709.3 --

Signed and Sealed this
Twentieth Day of October, 2020

Andrei Iancu
*Director of the United States Patent and Trademark Office*